United States Patent
Bobusch et al.

(10) Patent No.: US 11,668,682 B2
(45) Date of Patent: Jun. 6, 2023

(54) FLUIDIC COMPONENT, ULTRASONIC MEASUREMENT DEVICE HAVING A FLUIDIC COMPONENT OF THIS TYPE, AND APPLICATIONS OF THE ULTRASONIC MEASUREMENT DEVICE

(71) Applicant: FDX Fluid Dynamix GmbH, Berlin (DE)

(72) Inventors: Bernhard Bobusch, Berlin (DE); Oliver Krueger, Berlin (DE); Jens Hermann Wintering, Berlin (DE)

(73) Assignee: FDX Fluid Dynamix GmbH, Berlin (DE)

( * ) Notice: Subject to any disclaimer, the term of this patent is extended or adjusted under 35 U.S.C. 154(b) by 312 days.

(21) Appl. No.: 16/955,909

(22) PCT Filed: Dec. 20, 2018

(86) PCT No.: PCT/EP2018/086251
§ 371 (c)(1),
(2) Date: Jun. 19, 2020

(87) PCT Pub. No.: WO2019/122159
PCT Pub. Date: Jun. 27, 2019

(65) Prior Publication Data
US 2021/0072193 A1    Mar. 11, 2021

(30) Foreign Application Priority Data
Dec. 20, 2017   (DE) .................. 10 2017 130 765.6

(51) Int. Cl.
*G01N 29/22* (2006.01)
*B06B 1/20* (2006.01)
(Continued)

(52) U.S. Cl.
CPC ............. *G01N 29/222* (2013.01); *B06B 1/20* (2013.01); *F15C 1/22* (2013.01); *G01N 29/04* (2013.01);
(Continued)

(58) Field of Classification Search
CPC ...... G01N 29/222; G01N 29/04; G01N 29/34; G01N 2291/044; F15C 1/22; B06B 1/20;
(Continued)

(56) References Cited

U.S. PATENT DOCUMENTS 3,001,698 A * 9/1961 Warren ................ F15C 1/12
137/83
3,158,166 A * 11/1964 Warren ................ F15C 1/22
137/835
(Continued)

FOREIGN PATENT DOCUMENTS

DE  2051804  5/1971
DE  2065063  5/1972
(Continued)

*Primary Examiner* — Minh Q Le
(74) *Attorney, Agent, or Firm* — The Webb Law Firm

(57) ABSTRACT

A fluidic component for generating an ultrasound signal is provided. The fluidic component includes a flow chamber, which can be flowed through by a fluid flow, which enters the flow chamber through an inlet opening of the flow chamber and exits from the flow chamber through an outlet opening of the flow chamber. The fluidic component has at least one device for forming an oscillation of the fluid flow at the outlet opening, the oscillation taking place in an oscillation plane, a separation device, which is designed to separate off a part from the oscillating fluid flow. The separation device includes an inlet opening, through which the oscillating fluid flow enters the separation device, and at
(Continued)

least one first outlet opening and at least one second outlet opening, through each of which a part of the oscillating fluid flow exits.

20 Claims, 10 Drawing Sheets

(51) Int. Cl.
*F15C 1/22* (2006.01)
*G01N 29/04* (2006.01)
*G01N 29/34* (2006.01)
*G01P 3/26* (2006.01)
*G04F 13/06* (2006.01)

(52) U.S. Cl.
CPC ....... *G01N 29/34* (2013.01); *G01N 2291/044* (2013.01); *G01P 3/263* (2013.01); *G04F 13/06* (2013.01); *Y10T 29/494* (2015.01); *Y10T 137/212* (2015.04)

(58) Field of Classification Search
CPC ........ G01P 3/263; G04F 13/06; Y10T 29/494; Y10T 137/212
USPC ....... 137/828, 833, 834, 835, 841, 826, 836, 137/837
See application file for complete search history.

(56) References Cited

U.S. PATENT DOCUMENTS

| | | | | |
|---|---|---|---|---|
| 3,159,168 A * | 12/1964 | Reader | ...................... | F15C 1/08 137/835 |
| 3,159,169 A * | 12/1964 | Reader | ...................... | F15C 1/08 137/838 |
| 3,228,410 A * | 1/1966 | Warren | ...................... | F15C 1/08 137/821 |
| 3,258,023 A * | 6/1966 | Bowles | ................... | F15B 5/003 137/841 |
| 3,275,016 A * | 9/1966 | Wood | ........................ | F15C 1/10 137/835 |
| 3,333,596 A * | 8/1967 | Bottone, Jr. | .............. | F15C 1/04 137/821 |
| 3,371,675 A * | 3/1968 | Hatch, Jr. | ................. | F15C 1/14 137/835 |
| 3,432,804 A | 3/1969 | Beeken | | |
| 3,437,099 A * | 4/1969 | Griffin, Jr. | ................ | F15C 1/10 137/841 |
| 3,442,281 A * | 5/1969 | Warren | ...................... | F15C 1/12 137/821 |
| 3,444,879 A * | 5/1969 | McLeod, Jr. | ............. | F15C 1/22 137/841 |
| 3,448,752 A * | 6/1969 | O'Neill | ...................... | F15C 1/08 137/826 |
| 3,507,295 A | 4/1970 | Beeken | | |
| 3,529,615 A * | 9/1970 | Kishel | ........................ | F15C 1/18 137/829 |
| 3,557,814 A * | 1/1971 | Neradka | ..................... | F15C 1/14 137/835 |
| 3,690,171 A | 9/1972 | Tippetts et al. | | |
| 3,729,702 A | 4/1973 | Beeken et al. | | |
| 3,986,957 A | 10/1976 | Wilkes | | |
| 4,482,366 A * | 11/1984 | Camplin | ................... | F15C 1/22 96/426 |
| 4,905,909 A | 3/1990 | Woods | | |
| 4,913,260 A * | 4/1990 | Fallon | ....................... | F01N 1/10 181/254 |
| 5,165,438 A | 11/1992 | Facteau et al. | | |
| 6,240,945 B1 * | 6/2001 | Srinath | ..................... | B05B 1/08 137/833 |
| 7,080,661 B1 * | 7/2006 | Ayer | ....................... | B05B 17/08 137/550 |
| 7,080,664 B1 * | 7/2006 | Ayer | ......................... | F15C 1/08 137/834 |
| 7,134,609 B1 | 11/2006 | Stouffer et al. | | |
| 7,293,722 B1 | 11/2007 | Srinath et al. | | |
| 7,354,008 B2 | 4/2008 | Hester et al. | | |
| 8,733,401 B2 * | 5/2014 | Schultz | ................... | E21B 28/00 137/15.01 |
| 2008/0132775 A1 * | 6/2008 | Engan | ..................... | A61B 8/485 600/407 |
| 2011/0005334 A1 * | 1/2011 | Haynes | .................. | F23N 5/242 73/861.19 |
| 2013/0329523 A1 | 12/2013 | Karl | | |
| 2014/0251719 A1 * | 9/2014 | Feld | ................... | F02M 35/1272 181/229 |
| 2015/0238982 A1 | 8/2015 | Koklu | | |
| 2017/0145880 A1 * | 5/2017 | Nelson | .................... | F01N 1/083 |
| 2018/0161786 A1 | 6/2018 | Bobusch et al. | | |
| 2020/0049667 A1 | 2/2020 | Strangfeld et al. | | |
| 2020/0072955 A1 * | 3/2020 | Haag | ....................... | G01S 7/527 |
| 2021/0223758 A1 * | 7/2021 | Rafferty | .................. | F15D 1/12 |

FOREIGN PATENT DOCUMENTS

| | | |
|---|---|---|
| DE | 202015104279 U1 | 12/2016 |
| DE | 102016120454 A1 | 4/2018 |
| EP | 0305996 A1 | 3/1989 |
| EP | 0724994 A2 | 8/1996 |
| EP | 2390632 A1 | 11/2011 |
| GB | 1482527 | 8/1977 |
| GB | 2513413 A | 10/2014 |

* cited by examiner

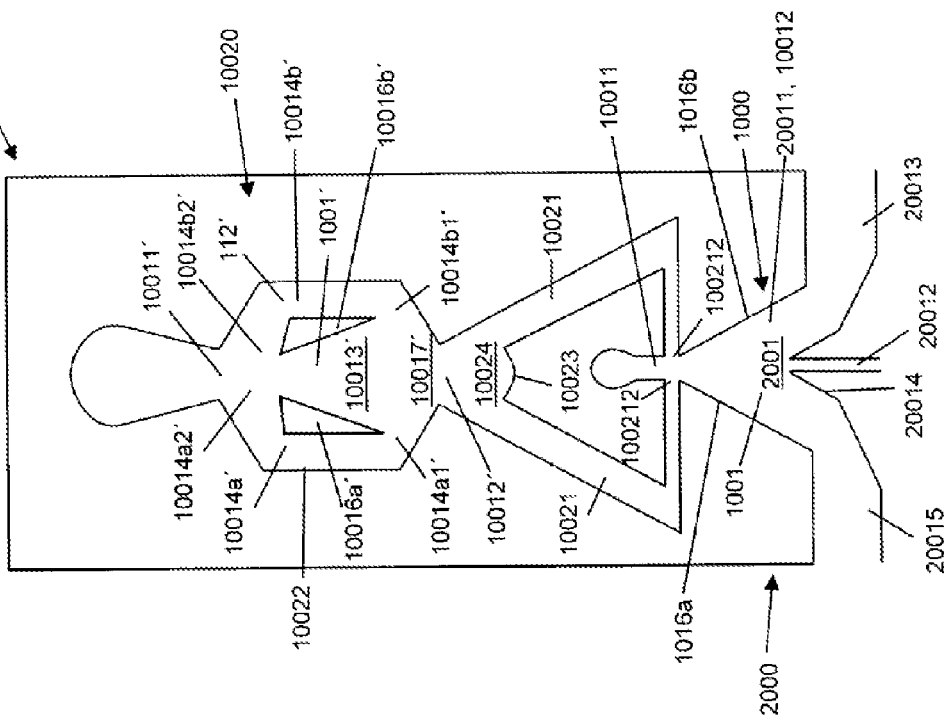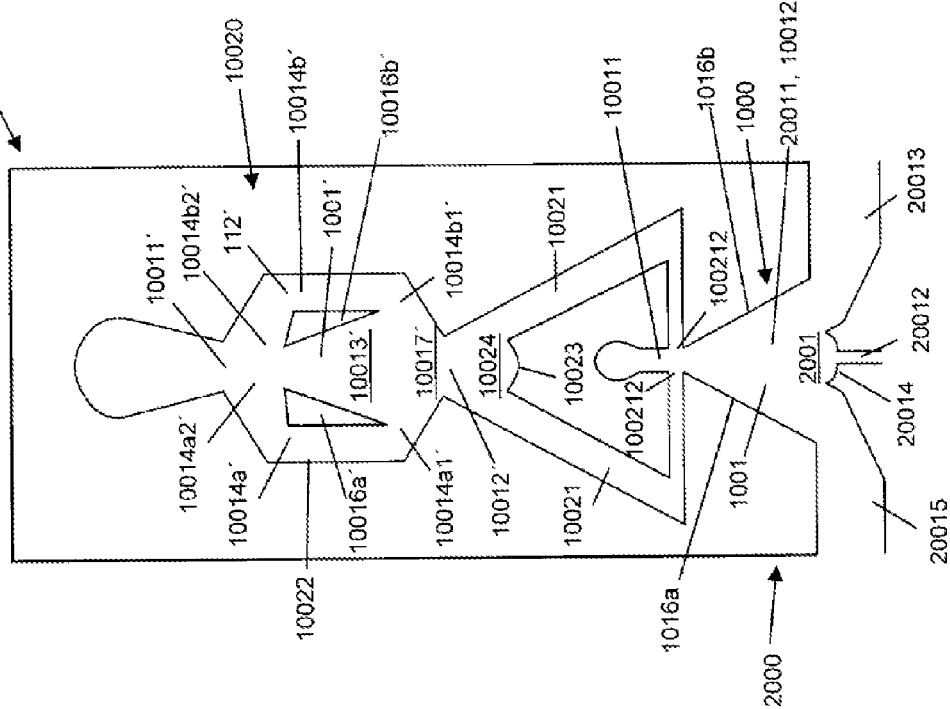

FLUIDIC COMPONENT, ULTRASONIC MEASUREMENT DEVICE HAVING A FLUIDIC COMPONENT OF THIS TYPE, AND APPLICATIONS OF THE ULTRASONIC MEASUREMENT DEVICE

CROSS-REFERENCE TO RELATED APPLICATIONS

This application is the United States national phase of International Application No. PCT/EP2018/086251 filed Dec. 20, 2018, and claims priority to German Patent Application No. 10 2017 130 765.6 filed Dec. 20, 2017, the disclosures of which are hereby incorporated by reference in their entirety.

BACKGROUND OF THE INVENTION

Field of the Invention

The disclosure relates to an ultrasonic measurement device and to various applications of the ultrasonic measurement device.

Description of the Related Art

Ultrasonic measurement devices (or else ultrasonic sensors, ultrasonic probes) can be used for a series of applications. In medical technology, ultrasonic measurement devices are used for non-invasive examination of organs of a human/animal body. Other applications are for example non-destructive material testing, distance determination or location of objects.

Known ultrasonic measurement devices have a device for generating an ultrasonic signal (a transmitter), a device for receiving an ultrasonic signal (a receiver) and a signal processing unit for processing the received ultrasonic signal.

In this case, the device for generating an ultrasonic signal generates ultrasonic pulses. These pulses are directed at a body/object, where an interaction of the ultrasonic pulses with the body/object takes place. Some of the pulses applied are returned and registered by the device for receiving an ultrasonic signal. By means of the signal processing unit, conclusions with respect to a property/condition or the position of the body/object can be drawn on the basis of the pulses received.

Various methods and devices for generating an ultrasonic signal are known from the prior art. In the case of one method, for example, a pulsed electrical signal is converted into an ultrasonic signal by means of a piezoelectric ceramic. It is also known to use oscillating membranes or thermoacoustic transducers for generating an ultrasonic signal.

For the transmission of the ultrasonic signal from the device for generating an ultrasonic signal to the body/object, often a solid, gel-like or liquid coupling means is used. Thus, in the case of the so-called squirter technique, the ultrasonic pulse is coupled into the body/object by way of a water jet. However, coupling in of the ultrasonic pulses by means of liquid media is often not desired, not allowed or technically not possible. Therefore, ultrasonic measurement devices with which the ultrasonic pulses can be coupled into the body/object (and also coupled out again) by way of an air path are desired.

However, with air-coupled ultrasound transmission there is the problem that, in the case of known ultrasonic probes, the ultrasonic signal generated is already largely reflected at the boundary surface between the ultrasonic probe and the surrounding air and only reaches the body/object to be examined in an attenuated state. Therefore, only a very small part of the ultrasonic signal leaves the ultrasonic probe and is available for the actual measurement. This is caused by the great difference in the characteristic acoustic impedance of the materials of the probe and air as the coupling medium. Therefore, great losses are produced by reflection when the signal passes the boundary surfaces between the materials of the probe and the surrounding air. In the case of air-coupled ultrasonic measurement, there are at least four boundary surfaces that have to be overcome: First of all, for the ultrasonic signal generated, there is the boundary surface between a solid-state ultrasound exciter (transmitter, for example a piezo transducer) of the ultrasonic probe and the surrounding air, then between the air and the body/object to be examined. For the reflected ultrasonic signal, there is the boundary surface between the body/object to be examined and the surrounding air and finally the boundary surface between the surrounding air and a measuring pickup (receiver). Accordingly, there is altogether a strong signal attenuation for the measurement. In this context, a boundary surface is understood as meaning the contact region between the coupling medium (air, gas or gas mixture) and a solid. This solid may be for example the body/object to be examined or the ultrasound exciter (transmitter) or measuring pickup (receiver). The reflections at the boundary surfaces also make the evaluation of the ultrasonic signal returned by the body/object more difficult due to overlays (interferences). Moreover, the angular resolution and the range are relatively low. Therefore, it is very difficult to use air-coupled ultrasound in practice.

SUMMARY OF THE INVENTION

The proposed solution is based on the object of providing a component for an ultrasonic measurement device that allows a transmission of the ultrasonic signal from the device for generating an ultrasonic signal to the body/object to be examined by way of a gaseous coupling means, while the aforementioned disadvantages do not occur, or to a greatly reduced extent.

This object is achieved by a fluidic component for generating an ultrasonic signal with features as described herein.

Accordingly, the fluidic component for generating an ultrasonic signal has a flow chamber, which can be flowed through by a fluid flow, which enters the flow chamber through an inlet opening of the flow chamber and exits from the flow chamber through an outlet opening of the flow chamber. In this case, the fluidic component has at least one means for forming an oscillation of the fluid flow at the outlet opening of the flow chamber, the oscillation taking place in an oscillation plane with an oscillation frequency. At the outlet opening of the flow chamber there is accordingly generated a fluid flow that wanders back and forth in the oscillation plane with the oscillation frequency between two maximum deflections, which form an oscillation angle. The means for forming an oscillation may be for example at least one secondary flow channel. Alternatively, other means for forming an oscillation of the fluid flow may also be provided, such as for example turbulators or colliding fluid jets. In particular, the fluidic component does not comprise any moving components that are required for generating the oscillating fluid flow. As a result, the fluidic component does not have any, or scarcely any, effects of wear and is correspondingly robust.

The fluidic component according to the proposed solution is distinguished by a separation device, which is designed to separate off a part from the oscillating fluid flow in order to generate a fluid flow pulse. The separation device has an inlet opening, through which the oscillating fluid flow enters the separation device. The separation device also has at least one first outlet opening and at least one second outlet opening, through each of which a part of the oscillating fluid flow exits. Provided between the at least one first outlet opening of the separation device and the at least one second outlet opening of the separation device is a flow divider, which deflects the oscillating fluid flow alternately into the at least one first and at least one second outlet opening of the separation device. The separation device is in this case designed in such a way that the part of the oscillating fluid flow that is deflected into the at least one first outlet opening of the separation device and the part of the oscillating fluid flow that is deflected into the at least one second outlet opening of the separation device are not brought together again downstream of the flow divider.

That is to say that the separation device does not have downstream of the flow divider any deflecting device (for example in the form of channels) that is formed so as to deflect the parts of the fluid flow in such a way that they recombine or meet one another downstream of the flow divider inside or outside the device.

This can achieve the effect that at least two (temporally and spatially limited) parts are cut out from the oscillation profile of the fluid flow by the flow divider, and are in each case deflected as a pulse sequence into the at least one first and at least one second outlet opening of the separation device, the pulse sequences being phase-shifted. The configuration of the separation device allows at least one of the pulse sequences to exit from the fluidic component and be used as an ultrasonic signal, the frequency of the ultrasonic signal depending inter alia on the oscillation frequency of the oscillating fluid flow. Interference with the other pulse sequence can be avoided.

In particular, it may be provided that the separation device is designed in such a way that the part of the fluid flow that exits from the at least one first outlet opening of the separation device and the part of the fluid flow that exits from the at least one second outlet opening of the separation device are in each case directed along an axis, the axes diverging in the direction of fluid flow. It can in this way be prevented that the parts intersect and interfere downstream of the flow divider. In order to avoid overlaying of the parts of the fluid flow exiting from the at least one first and at least one second outlet opening of the separation device, it may be provided that the cross-sectional areas of the at least one first and the at least one second outlet opening of the separation device (in each case transversely to the respective direction of fluid flow) form an angle with one another that lies between 30° and 150°, for example is substantially 90°. The expression "transversely to" should always be understood as "perpendicularly to".

Alternatively, the axes may be parallel to one another. However, here the distance between the at least one first outlet opening and the at least one second outlet opening of the separation device should be chosen to be sufficiently great, so as to avoid interference between the parts of the fluid flow exiting from these outlet openings.

The at least one first outlet opening and the at least one second outlet opening of the separation device may be arranged in a plane which is in or parallel to the oscillation plane of the oscillating fluid flow exiting from the flow chamber. In particular, the at least one first outlet opening and the at least one second outlet opening of the separation device may be at a distance from one another in such a way that they are alternately flowed through by the oscillating back and forth fluid flow that exits from the flow chamber.

According to one embodiment, the at least one first outlet opening of the separation device and the inlet opening of the separation device have in each case an extent (width) in the oscillation plane and transversely to the direction of fluid flow, said extent (width) of the at least one first outlet opening of the separation device being less than or equal to 150% of said extent of the inlet opening of the separation device, preferably less than or equal to said extent of the inlet opening of the separation device, and in particular preferably less than or equal to 75% of said extent of the inlet opening of the separation device.

The stated size ratios of the widths allow temporally separate fluid flow pulses that have the smallest possible pulse width to be generated. To be understood here as the pulse width is the full width at half maximum, that is to say the width of a pulse at half the height of the pulse or the width at the height of half the maximum of the pulse. The inlet opening of the separation device and the at least one first outlet opening and the at least one second outlet opening of the separation device are in each case defined here at the location of the separation device with the smallest cross-sectional area in each case transversely to the direction of fluid flow that the fluid flow passes when it enters the separation device or exits again from the separation device. It should be mentioned in this connection that the inlet opening of the flow chamber and the outlet opening of the flow chamber are defined where the flow chamber has the smallest cross-sectional areas transversely to the direction of flow that the fluid flow passes when it enters the flow chamber or exits again from the flow chamber.

The fluidic component may consequently generate temporally separate fluid flow pulses (with a small pulse width), which exit the fluidic component through the at least one first outlet opening of the separation device and can be used as ultrasonic pulses for an ultrasonic measurement device. For setting the frequency of the fluid flow pulses, that is to say the pulse interval between successive fluid flow pulses, for example the oscillation frequency of the oscillating fluid flow may be set. In this case, the pulse interval is the interval between the maximum of a fluid flow pulse and the maximum of the next-following fluid flow pulse. Further possibilities for influencing the pulse width and the pulse interval are explained later in the description.

The ultrasonic pulse is generated by the fluidic component directly in the fluid that flows through the fluidic component. The fluid may be chosen as desired. Thus, it may for example be a gaseous fluid, in particular air. The fluid may however also be a liquid fluid. If the fluid is air, the fluidic component consequently does not need any coupling means, or to put it another way the ultrasonic pulse is generated in the coupling means. If the fluid is a gas other than air and the coupling means is air, at least the difference in the characteristic acoustic impedance between the gas and air is so small that no great reflection occurs at the boundary surface between the fluid and the coupling means. The disadvantageous consequences of the reflection mentioned at the beginning are consequently reduced. In particular, a great part of the ultrasonic signal generated is thus available in practice.

Moreover, it is possible to dispense with moving components for generating the oscillating fluid flow, so that costs and expenditure caused as a result are not incurred. Moreover, by dispensing with movable components, the development of vibration and noise by the fluidic component according to the solution is relatively low.

According to a further embodiment, the at least one first outlet opening and the at least one second outlet opening of the separation device have a different extent (width) in the oscillation plane and transversely to the direction of fluid flow. Consequently, for example, a deflection that is particularly small (in comparison with the inlet opening of the separation device) in the oscillation plane and transversely to the direction of fluid flow may be chosen for the at least one first outlet opening of the separation device in order to set a desired pulse width of the fluid flow pulse that exits from the at least one first outlet opening of the separation device, without an undesired increase in pressure occurring in the separation device. Thus, the at least one first outlet opening of the separation device may be provided to give off part of the oscillating fluid flow as an ultrasonic signal, while the at least one second outlet opening of the separation device may be provided to give off a remainder of the fluid flow. Accordingly, the at least one first outlet opening of the separation device may be configured in a way corresponding to the desired fluid flow pulse properties, while the at least one second outlet opening of the separation device may be configured as desired within a framework in which the fluid flow pulse that exits from the at least one first outlet opening of the separation device is not impaired. Thus, in particular, the width (extent in the oscillation plane and transversely to the direction of fluid flow) of the at least one first outlet opening (which emits the ultrasonic signal) may be less by 50% than the width of the at least one second outlet opening, the height (extent transversely to the oscillation plane) being the same in each case. With a different height of the at least one first and at least one second outlet opening, the resultant cross-sectional area of the outlet openings is considered. It is advantageous if (both when the height is the same and when the height is different) the cross-sectional area of the at least one first outlet opening corresponds to $\frac{1}{5}$ (or less) of the cross-sectional area of the at least one second outlet opening, and particularly advantageous if the cross-sectional area of the at least one first outlet opening corresponds to $\frac{1}{10}$ (or less) of the cross-sectional area of the at least one second outlet opening. The cross-sectional area of the at least one first outlet opening may even correspond to only $\frac{1}{20}$ (or less) of the cross-sectional area of the at least one second outlet opening.

According to one embodiment, it may be provided that the separation device is arranged downstream of the outlet opening of the flow chamber. Thus, the flow chamber and the separation device may form two units, which may be formed together, for example as one piece. Alternatively, the two units may be constructed from two (or more) elements. In particular, the outlet opening of the flow chamber may correspond to the inlet opening of the separation device. Alternatively, the separation device may protrude into the flow chamber (through the outlet opening of the flow chamber).

Provided between the at least one first outlet opening of the separation device and the at least one second outlet opening of the separation device is a flow divider, which deflects the oscillating fluid flow alternately into the at least one first and at least one second outlet opening of the separation device. The flow divider may have various forms. Thus, the flow divider may comprise a planar wall. Alternatively, the flow divider may comprise at least one curved wall, the cross section of the at least one curved wall in the oscillation plane describing a curved arc, which, when viewed in the direction of fluid flow, is curved outwardly (concavely). Such a configuration of the flow divider allows a binary or digital flow pattern of the fluid exiting at the at least one first outlet opening of the separation device to be achieved. In order to further assist the formation of a binary or digital flow pattern, it may be provided that the flow divider and a wall that is adjacent to the flow divider and bounds the at least one first outlet opening of the separation device form an angle which (when viewed in the oscillation plane) is less than 95°, preferably less than 70°, in particular preferably less than 45°.

It is also conceivable that the flow divider is designed in the form of a wedge with two (planar or curved) surfaces and an edge, the edge and the two surfaces extending at an angle (for example substantially 90°) to the oscillation plane and the two surfaces forming in the oscillation plane an angle which is less than 95°, preferably less than 70°, in particular preferably less than 45°. In this case, the wedge protrudes into the separation device counter to the direction of fluid flow.

The flow chamber may have an extent perpendicularly to the oscillation plane that is defined as the depth. In the depth, the flow chamber is bounded by a front wall and a rear wall opposite the front wall. The front wall and the rear wall may be aligned substantially parallel and be congruent. In particular, the depth of the flow chamber (the distance between the front wall and the rear wall) may be variable. For this purpose, at least one boundary wall bounding the flow chamber depthwise (front wall and/or rear wall) may be produced from a deformable (elastic) material. By applying an external force to the front wall and/or rear wall from an outer side of this wall, it can deform, while reducing the depth of the flow chamber, and thereby move (partly) into the flow chamber. It is also conceivable that the depth of the flow chamber is variable by plunger-like displacement of at least one boundary wall bounding the flow chamber depthwise (front wall and/or rear wall). Accordingly, boundary walls of the flow chamber that extend substantially perpendicularly to the oscillation plane must likewise be variable, for example be formed telescopically.

According to a further embodiment, the at least one first outlet opening of the separation device is variable in its position, form and/or size. It should be stated in this respect that the at least one outlet opening of the separation device (and also the at least one second outlet opening of the separation device) may be formed as a hole in a boundary wall of the separation device or as a channel. In the case of the latter configurational variant, sizes of the outlet opening are then defined at the location of the channel at which the channel has the smallest cross-sectional area perpendicularly to the direction of fluid flow. For setting a desired pulse width of the fluid flow pulse, the extent (width) in the oscillation plane and transversely to the direction of fluid flow of the at least one first outlet opening may be varied. For setting a desired pulse width of the fluid flow pulse, the extent (depth) perpendicularly to the oscillation plane of the at least one first outlet opening may also be varied. The smaller the width and depth of the at least one first outlet opening are, the smaller the pulse width achieved of the fluid flow pulse.

The means for forming an oscillation may for example comprise at least two secondary flow channels, which are in each case fluidically connected by way of an entrance and an exit to a main flow channel of the flow chamber and in each case extend between the corresponding entrance and the corresponding exit. The at least two secondary flow channels (as well as the main flow channel) may lie in the oscillation plane, and consequently in one plane. Alternatively, it is also possible for only one of the at least two secondary flow channels to lie in the oscillation plane. The oscillation profile of the oscillating fluid flow generated can be influenced by the specific configuration of the at least two secondary flow channels, for example by the length of the at least two secondary flow channels. The length of the path that the fluid flows through between the entrance of one secondary flow channel and the outlet passage of this secondary flow channel corresponds to the length of the secondary flow channel. In particular, it may be provided that the at least two secondary flow channels have different lengths. In particular, it can be achieved in this way that the fluid flow that oscillates in the oscillation plane between two maximum deflections stays longer in the region of one maximum deflection than in the region of the other maximum deflection. The greater the difference in the lengths of the at least two secondary flow channels is, the greater the pulse interval between two successive fluid flow pulses becomes. Thus, a first of the at least two secondary flow channels may be at least twice as long as a second of the at least two secondary flow channels, preferably at least five times as long. However, even significantly greater differences in size are conceivable, for example a factor of 2000 or more. This depends in particular on the desired pulse interval.

In order to increase the length of a secondary flow channel without thereby changing the outer installation space of the secondary flow channel, a meandering course may be provided, in order in this way to increase the path length for the fluid flowing through the secondary flow channel. An alternative to a meandering course may be created by additional resistances, turbulators or swirl chambers in the secondary flow channel.

As described above, the relative extent (width) in the oscillation plane and transversely to the direction of flow of the at least two secondary flow channels and the relative extent (depth) perpendicularly to the oscillation plane of the at least two secondary flow channels can also greatly influence the oscillation profile of the oscillating fluid flow, and consequently the pulse interval. The parameters of relative width, relative depth and relative length of the at least two secondary flow channels can also be combined in any way desired in order to form the oscillation profile in a specific way.

The at least one first outlet opening of the separation device may be provided to give off a part of the oscillating fluid flow as an ultrasonic signal, which is used for example for a measurement. By contrast, the at least one second outlet opening of the separation device may be provided to give off a remainder of the fluid flow and conduct it out of the fluidic component to the outside, in order to avoid an (undesired) pressure build-up of the fluid in the separation device and the flow chamber. In order to avoid that the fluid exiting from the at least one second outlet opening of the separation device overlays the fluid flow pulses that exit from the at least one first outlet opening of the separation device, and thereby disturbs a measurement for which the fluid flow pulses of the at least one first outlet opening are used, it may be provided that a device for sound attenuation (for example by active or passive elements), which absorb or attenuate the fluid flow pulses exiting through the at least one second outlet opening, is provided in the region of the at least one second outlet opening of the separation device.

As already mentioned, temporally separate fluid flow pulses can be generated by the fluidic component. In particular, the fluidic component may be designed to generate an ultrasonic signal which comprises pulses with a temporal pulse interval in relation to one another and in each case a full width at half maximum, the pulse interval being greater than or equal to twice the full width at half maximum, in particular greater than or equal to ten times the full width at half maximum, in particular preferably greater than or equal to one hundred times the full width at half maximum. Such an ultrasonic signal has temporally clearly separate ultrasonic pulses, which are suitable for ultrasonic measuring methods. In principle, a great pulse interval is advantageous. The higher the pulse interval is, the deeper into the material to be examined the measurement can take place. With the fluidic component according to the solution, it is even possible for ultrasonic pulses with a pulse interval that is greater than five thousand times the pulse width to be generated. In order to set the desired ratio of pulse interval to pulse width, the extent of the at least one first outlet opening of the separation device transversely to the direction of fluid flow (in the outlet opening) and in the oscillation plane in comparison with the corresponding extent of the at least one second (third) outlet opening of the separation device or the cross-sectional area of the at least one first outlet opening of the separation device in comparison with the cross-sectional area of the at least one second (third) outlet opening of the separation device can be chosen to be particularly small (in particular a ratio of less than 1:1).

A further embodiment provides that the means for forming an oscillation of the fluid flow comprises a device for providing an oscillating auxiliary fluid flow and at least one feed line, which is fluidically connected on the one hand to said device and on the other hand to the flow chamber of the fluidic component in order to feed the auxiliary fluid flow to the flow chamber. In this case, the at least one feed line is arranged with respect to the flow chamber in such a way that the auxiliary fluid flow enters the flow chamber at an angle unequal to 0° in relation to the fluid flow flowing from the inlet opening to the outlet opening. Since the auxiliary fluid flow is provided by said device as an oscillating auxiliary fluid flow, the at least one feed line feeds the auxiliary fluid flow to the flow chamber of the fluidic component variably over time. "Variably over time" is meant here to mean that the amount of auxiliary fluid flow fed at different points in time is different in magnitude, since the feed line only conducts a cut-out portion of the oscillating auxiliary fluid flow.

With this embodiment, which in principle represents a combination of two fluidic components, the oscillation frequency of an oscillating fluid flow can be decoupled from its volumetric flow (mass flow). An ultrasonic signal with pulses which on the one hand are temporally distinctly separate and have a small pulse width and on the other hand have the same intensity, even if the interval between successive pulses changes, is desirable for ultrasonic measurements. The pulse interval is substantially dependent on the oscillation frequency of the oscillating fluid flow from which a part is separated out for generating a pulse by means of the separation device. The intensity of a pulse is dependent on the volumetric flow or on the entry pressure. (The flow rate within the component can be influenced by the entry pressure or by the volumetric flow.) If the pulse interval is to be changed, a change of the oscillation frequency can be brought about. However, this is usually accompanied by a change in the volumetric flow, and consequently also a change in the signal intensity. This embodiment is suitable for decoupling the oscillation frequency of an oscillating fluid flow from its volumetric flow (mass flow) by combining two fluidic components, in that the one fluidic component determines the volumetric flow (mass flow) and the other fluidic component (later referred to as the second fluidic component) determines the oscillation frequency. In this way, the pulse interval and signal intensity can be decoupled.

It is conceivable that the device for providing an auxiliary fluid flow comprises a second fluidic component, which comprises a flow chamber that can be flowed through by the auxiliary fluid flow, which enters the flow chamber through an inlet opening of the flow chamber and exits from the flow chamber through an outlet opening of the flow chamber. In this case, the second fluidic component may be designed in such a way that it has at least one means for forming an oscillation of the auxiliary fluid flow at the outlet opening (of the flow chamber of the second fluidic component), it being possible for the oscillation to take place for example in an oscillation plane. In particular, the at least one means for forming an oscillation of the auxiliary fluid flow may comprise a secondary flow channel, which is fluidically connected by way of an entrance and an exit to a main flow channel of the flow chamber (of the second fluidic component) and extends between the entrance and the exit. The second fluidic component can in this way provide an auxiliary fluid flow oscillating in an oscillation plane, which is fed to the flow chamber of the fluidic component by way of the at least one feed line.

In order to be able to use the oscillating motion more efficiently, the means for forming an oscillation of the fluid flow may comprise two feed lines, which are in each case fluidically connected to the flow chamber on opposite sides of the flow chamber of the fluidic component. Consequently, the auxiliary fluid flow can be conducted into the flow chamber of the fluidic component from opposite sides and act on the fluid flow flowing there from the inlet opening to the outlet opening and divert it from a substantially straight direction of fluid flow laterally (alternately in opposite directions).

In order to deflect the oscillating auxiliary fluid flow exiting from the device for providing an auxiliary fluid flow (in particular from the second fluidic component) alternately into the two feed lines, a second flow divider may be provided downstream of this device (as part of the means for forming an oscillation of the fluid flow). In this case, the second flow divider is designed and arranged with respect to the device for providing an auxiliary fluid flow in such a way that at different times the second flow divider in each case separates out a part from the oscillating fluid flow. For this purpose, the second flow divider has in particular a branching element, which forms two branches, the two branches preferably being arranged in the oscillation plane of the auxiliary fluid flow and in each case being fluidically connected to one of the two feed lines. In this way, the two feed lines are flowed through by the auxiliary fluid flow at offset times. Accordingly, the part of the auxiliary fluid flow that flows into the flow chamber of the fluidic component from one side acts on the fluid flow flowing in the flow chamber of the fluidic component at a different point in time than the part of the auxiliary fluid flow that flows into the flow chamber of the fluidic component from the opposite side. In this way, the fluid flow can be diverted alternately from one or the other part of the auxiliary fluid flow and be excited to oscillate (in one plane). In this embodiment, the fluidic component may also be referred to as a bistable wall attachment amplifier.

The pulse interval of the fluid flow pulses exiting from the separation device can be influenced by the geometry of the means for forming an oscillation of the fluid flow, by the form of the flow divider of the separation device and by the relative cross-sectional size of the relevant outlet opening of the separation device, and the pulse width can be additionally influenced by the form of the fluidic component itself. The relevant outlet opening is the outlet opening of the separation device through which the part of the fluid flow that is intended to serve as a useful signal flows. The pulse intensity can be influenced substantially by the entry pressure at the inlet opening of the fluidic component.

The pulse width and the intensity of the useful signal that exits from the at least one first outlet opening of the separation device can be influenced by the so-called switching time of the fluid flow in the flow chamber of the fluidic component. To be understood as the switching time is the time period that the fluid flow requires to pass from one side wall of the flow chamber, in which an opening by way of which the flow chamber is fluidically connected to a feed line is provided, to the opposite side wall, which may likewise have such an opening. The switching time may lie in the range below 10 ms, in order to obtain a pulse width that is as small as possible, below 100 µs. For the ultrasonic testing of concrete, a pulse width in particular in the range between 50 µs and 5 µs is of interest.

As already mentioned, the oscillation frequency of the fluid flow exiting from the fluidic component determines in particular the pulse interval. This oscillation frequency is dictated by the oscillation frequency of the auxiliary fluid flow of the second fluidic component. The desired pulse interval, and consequently the required oscillation frequency, may vary. What is decisive in particular is the speed of the measuring technology used. Thus, in the case of the ultrasonic testing of concrete, the pulse interval must be greater than the time that the pulse needs to pass from the excitation system to the receiver system through the component to be tested. The pulse interval is empirically at least 250 µs and up to 10 ms. If, for generating the pulses, a part is separated out by means of the separation device from the oscillating fluid flow that exits from the fluidic component, approximately midway between the maximum deflections of the oscillating fluid flow, the fluidic component can be operated with an oscillation frequency of 50 Hz to 2000 Hz. Particularly preferred is an oscillation frequency of the fluidic component between 100 Hz and 1200 Hz (corresponds to a pulse interval of about 416 µs to 5 ms).

According to a further embodiment, the separation device provided downstream of the outlet opening of the fluidic component comprises at least one first outlet opening, at least one second outlet opening and at least one third outlet opening, through each of which a part of the oscillating fluid flow exits. Provided in this case between the at least one first outlet opening of the separation device, the at least one second outlet opening of the separation device and the at least one third outlet opening of the separation device is a flow divider, which deflects the oscillating fluid flow alternately into the at least one first, second and third outlet opening of the separation device. Preferably, in this case one of the outlet openings (the first) of the separation device lies on an axis which extends substantially midway between the maximum deflections of the oscillating fluid flow. Consequently, this one (first) outlet opening takes up the part of the oscillating fluid flow that lies midway between the maximum deflections of the oscillating fluid flow. Consequently, the time interval of the points in time at which a part of the oscillating fluid flow flows into this one (first) outlet opening (and consequently the pulse interval) is substantially always of the same magnitude. In this case, this one (first) outlet opening preferably has a smaller cross-sectional area than the other outlet openings of the separation device. For example, this one (first) outlet opening of the separation device may lie on an axis which connects the inlet opening and the outlet opening of the fluidic component to one another. However, this one (first) outlet opening of the separation device may also lie outside this axis. For applications in which a constant pulse interval is not necessary, this one (first) outlet opening may lie on an axis which extends as desired (outside the midway position) between the maximum deflections of the oscillating fluid flow as long as the fluid flow can flow into this one (first) outlet opening. In this case, the axis which connects the inlet opening and the outlet opening of the fluidic component to one another and the axis on which this one (first) outlet opening lies may intersect at a point which is located upstream of this one (first) outlet opening. In this case, the pulse sequence has two alternating pulse intervals of different magnitudes.

The solution also relates to a device for generating an ultrasonic signal. This device comprises on the one hand a fluid flow source for providing a fluid flow and on the other hand a fluidic component according to the solution for generating an ultrasonic signal. In this case, the fluid flow source is fluidically connected to the inlet opening of the flow chamber of the fluidic component and delivers the fluid flow that flows through the fluidic component. Furthermore, it may comprise an auxiliary fluid flow source for providing the auxiliary fluid flow, which is fluidically connected to the inlet opening of the flow chamber of the device for providing an auxiliary fluid flow. The connection between the fluid flow source (auxiliary fluid flow source) and the fluidic component (device for providing an auxiliary fluid flow) may be releasably configured. The fluid flow source (auxiliary fluid flow source) may provide a fluid flow (auxiliary fluid flow) with a positive pressure (with respect to the ambient pressure) of for example 0.025 bar. The fluid flow source (auxiliary fluid flow source) may in particular comprise a (controllable) valve or some other control device, in order to set a pressure of the fluid flow (auxiliary fluid flow) exiting from the fluid flow source (auxiliary fluid flow source). By changing the entry pressure, the frequency of the fluid flow pulse generated can be adapted.

The fluid flow source may be in particular a gas flow source, which provides a gas as the fluid to the fluidic component. As a result, the ultrasonic signal generated by the fluidic component can be generated in the gas and coupled into a body/object by way of an air path without massive losses due to reflection at the boundary surface between the device for generating an ultrasonic signal and the surrounding air.

The fluid flow sources may be diverse and vary according to the specific application. They may be a pressure reservoir, in which the fluid is stored at a pressure that lies above the ambient pressure. The pressure reservoir may be mobile, for example a pressurized gas bottle or a pressurized air bottle. Alternatively, the fluid flow source may comprise an electrically or mechanically operated compressor, such as for example a diaphragm compressor, screw compressor or gear compressor. It is also conceivable that a positive pressure (in comparison with the ambient pressure) is branched off from a subsystem of an overall machine, for example a vehicle.

The solution also relates to an ultrasonic measurement device with a device for generating an ultrasonic signal, a device for receiving an ultrasonic signal, and a signal processing unit for processing the received ultrasonic signal. In this case, the device for generating an ultrasonic signal comprises a fluidic component according to the solution.

The ultrasonic measurement device may be operated with a gas as the fluid. In this way, the extent of the reflection of the generated ultrasonic signal at the boundary surface of the ultrasonic measurement device and the surrounding air can be significantly reduced. The disadvantageous consequences of the reflection mentioned at the beginning are consequently reduced. In particular, then a great part of the ultrasonic signal generated is available in practice for a measurement. A higher intensity of the ultrasonic signal that leaves the ultrasonic measurement device allows a higher measuring accuracy to be achieved. Also, greater ranges can be covered. The increased measuring accuracy and the range can be used for example in autonomous vehicle systems, for sensing the surroundings when parking or while driving, sometimes at high driving speeds.

The fluidic component according to the solution consequently allows an air-coupled transmission of the ultrasonic pulse to the body/object. This means in practice that the ultrasonic measuring device that comprises such a fluidic component does not need to touch the body/object. In medical technology and material testing, investigations can therefore be performed from a certain distance. In particular in medical technology, this can be of advantage for aspects of hygiene.

According to one embodiment, the device for receiving an ultrasonic signal is configured to receive an ultrasonic signal emitted by the device for generating an ultrasonic signal and reflected outside the ultrasonic measurement device and to receive a reference signal, the reference signal being provided by the part of the fluid flow exiting from the at least one second outlet opening of the separation device. The reference signal may serve as a trigger signal for the signal processing unit. For this purpose, the ultrasonic measurement device may have a device which is set up and designed to deflect the part of the fluid flow exiting from the at least one second outlet opening of the separation device or a part of this part onto the device for receiving an ultrasonic signal.

The solution also relates to a series of methods that use an ultrasonic measurement device, the ultrasonic measurement device for generating an ultrasonic signal comprising a fluidic component according to the solution. The methods are a method for the contactless examination of an object or a body by means of the ultrasonic measurement device and a method for determining a distance of an object from one or more further objects by means of the ultrasonic measurement device. The method for the contactless examination of an object or a body comprises methods in material testing for testing material properties of a body, methods in medical technology for the non-invasive examination of a body and methods in security technology (which may be used for example at airports) for checking people and objects. The solution also relates to a method for the contactless cleaning of an object by means of a device for generating an ultrasonic signal, the device for generating an ultrasonic signal comprising a fluidic component according to the solution.

The present disclosure in particular relates to the following methods: A method for the contactless examination of an object or a body by means of an ultrasonic measurement device, wherein for generating an ultrasonic signal the ultrasonic measurement device comprises a fluidic component according to an embodiment described herein. A method for determining a distance of an object from one or more further objects by means of an ultrasonic measurement device, wherein for generating an ultrasonic signal, the ultrasonic measurement device comprises a fluidic component according to an embodiment described herein. A method for the contactless cleaning of an object by means of a device for generating an ultrasonic signal, wherein the device for generating an ultrasonic signal comprises a fluidic component according to an embodiment described herein.

BRIEF DESCRIPTION OF THE DRAWINGS

The solution is explained in more detail below on the basis of embodiments in conjunction with the drawings.

FIG. 10 shows a sectional representation through a fluidic component according to a further embodiment of the solution; and FIG. 11 shows a sectional representation through a fluidic component according to a further embodiment of the solution.

DESCRIPTION OF THE INVENTION

Figure 1:
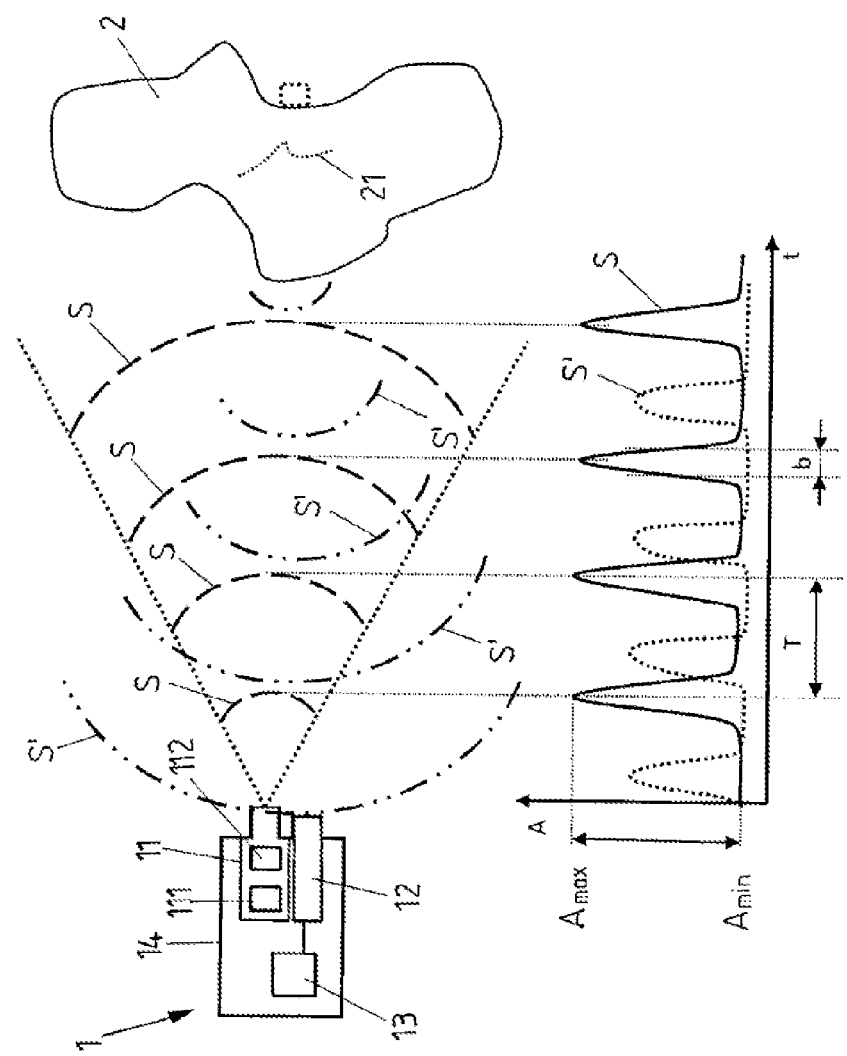
FIG. 1 shows a schematic representation of an ultrasonic measurement device according to one embodiment of the solution and of an object to be examined.

In FIG. 1, an ultrasonic measurement device 1 and an object 2 to be examined are schematically represented. With the ultrasonic measurement device 1, on the one hand the position of the object 2 in space can be determined and on the other hand the state (for example with respect to discontinuities 21) of the object 2 can be examined. FIG. 1 illustrates a method for the contactless examination of an object (or of a body) 2 by means of an ultrasonic measurement device 1, and also a method for determining a distance of a first object from a further object 2 by means of the ultrasonic measurement device 1. In the case of the latter method, the distance of the ultrasonic measurement device 1 from the first object is known, for example since the ultrasonic measurement device 1 is arranged on the first object.

The ultrasonic measurement device 1 comprises a device 11 for generating an ultrasonic signal S (transmitter), a device 12 for receiving an ultrasonic signal S' (receiver) and a signal processing unit 13 for processing the received ultrasonic signal S'. The generated ultrasonic signal S is represented by a dashed line and the ultrasonic signal S' to be received is represented by a dotted-dashed line. The ultrasonic measurement device 1 is aligned with respect to the object 2 in such a way that the ultrasonic signal S generated by the transmitter 11 is directed at the object 2. The ultrasonic signal S' to be received is the part of the generated ultrasonic signal S that is returned (reflected) by the object 2. In the embodiment from FIG. 1, the transmitter 11, the receiver 12 and also the signal processing unit 13 are accommodated in a housing 14. The housing 14 has corresponding openings, in order to give off the ultrasonic signal S generated by the device 11 for generating an ultrasonic signal S to the surroundings and in order to expose the receiver 12 for an ultrasonic signal S' to be received (reflected).

According to another embodiment, the receiver 12 may be located outside the housing 14. For example, the receiver 12 may be arranged in the vicinity or directly on the object 2 to be tested. A position given by way of example is represented in FIG. 1 by a dotted box. It is also possible for multiple receivers 12 to be provided, spatially distributed in order to be able to receive different reflections.

In the lower part of FIG. 1, the amplitude A of the generated ultrasonic signal S is also represented as a function over time t. This function can be interpreted as the deflection of the sound or of the acoustic pressure. The difference between the maximum amplitude $A_{max}$ and the minimum amplitude $A_{min}$ corresponds to the intensity of the ultrasonic signal S. The ultrasonic signal S comprises pulses, which have a pulse width b and are temporally separate. The pulse width b is in this case the full width at half maximum of the pulses. The time interval between the maximum amplitude $A_{max}$ of one pulse and the maximum amplitude $A_{max}$ of the next-following pulse is referred to as the pulse interval T. The amplitude of the ultrasonic signal S' reflected by the object 2 is also represented as a function over time t. The reflected ultrasonic signal S' is offset in time with respect to the generated ultrasonic signal S and has in comparison an increased full width at half maximum b.

Serving for generating the temporally separate ultrasonic pulses is the device 11 for generating an ultrasonic signal S, which comprises a fluid flow source 111 and a fluidic component 112, which are fluidically connected to one another. The ultrasonic signal S is generated directly in the fluid that is provided by the fluid flow source 111 and flows through the fluidic component 112. The ultrasonic signal is a sequence of fluid flow pulses. Here, the fluid flow source 111 is a pressurized gas source, in particular a pressurized air source. In the embodiment from FIG. 1, the fluid flow source 111 is arranged in the housing 14 of the ultrasonic measurement device 1. Alternatively, the fluid flow source 111 may be arranged outside the housing 14 of the ultrasonic measurement device 1. The fluid flow source 111 may also be releasably connected to the fluidic component 112. The fluidic component 112 is suitable for generating successive ultrasonic pulses with a pulse interval T, which corresponds to at least twice the pulse width b, preferably at least ten times the pulse width b and particularly preferably at least one hundred times the pulse width b. For a resolution that is as high as possible in the ultrasonic measurement, a small pulse width b is necessary. With the fluidic component 112, a small pulse width b can be specifically set for the desired application area.

The fluidic component 112 is suitable for generating a sequence of fluid flow pulses with a frequency of over 1 kHz. For the determination of the position of an object in space (that is to say with respect to at least one further object), a frequency range of over 40 kHz up to 200 kHz is suitable. For the non-destructive material testing of an object, a frequency of over 20 kHz up to 100 MHz is suitable. For non-invasive examination in medical technology, frequencies of 200 kHz to over 1 MHz are used. In this case, the inverse values of the pulse widths b are meant by the stated frequencies. For example, here a frequency of over 20 kHz means a pulse width b of less than 1/20000 s.

Figure 2:
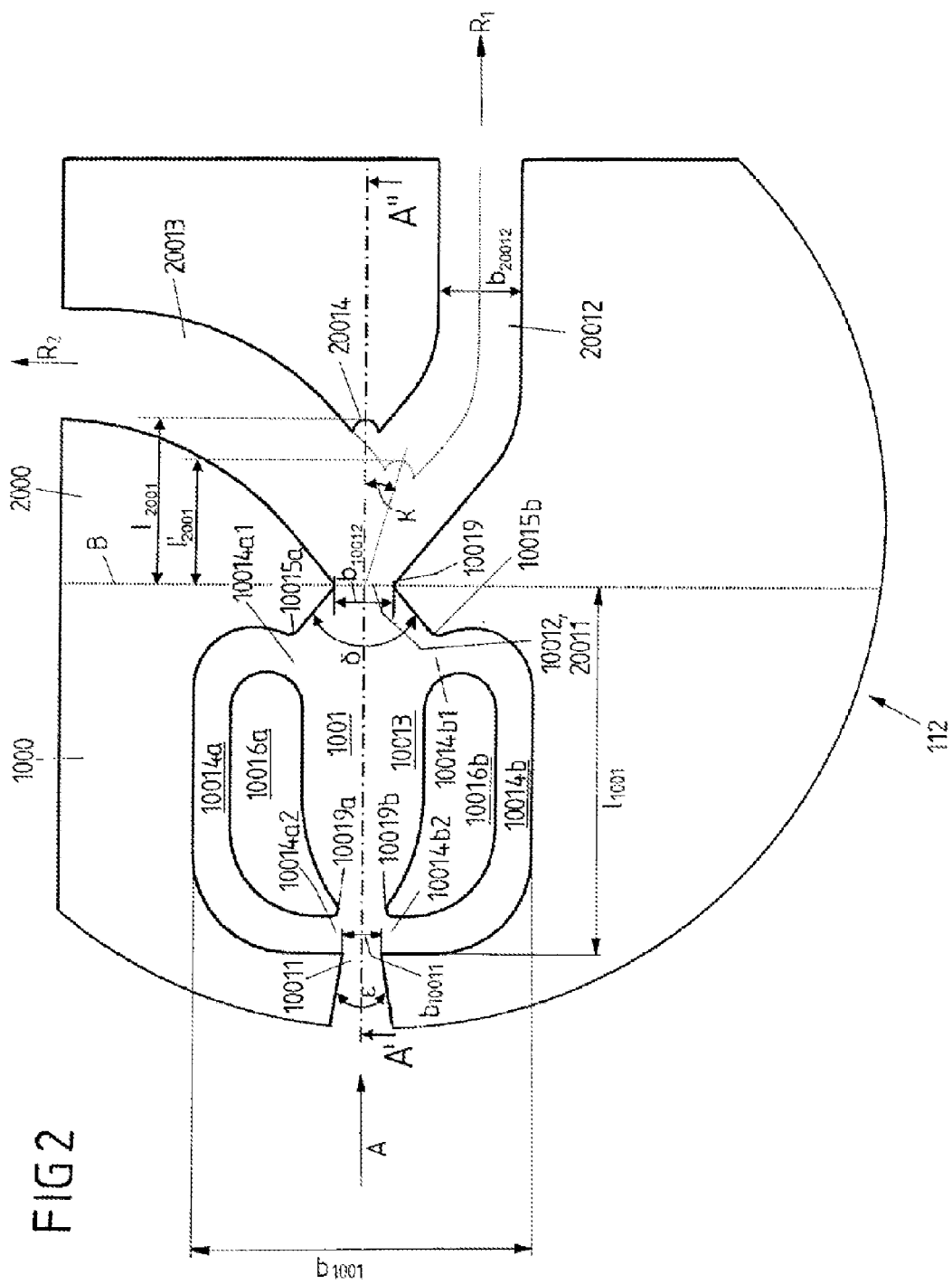
FIG. 2 shows a sectional representation through a fluidic component according to one embodiment of the solution.
Figure 3:
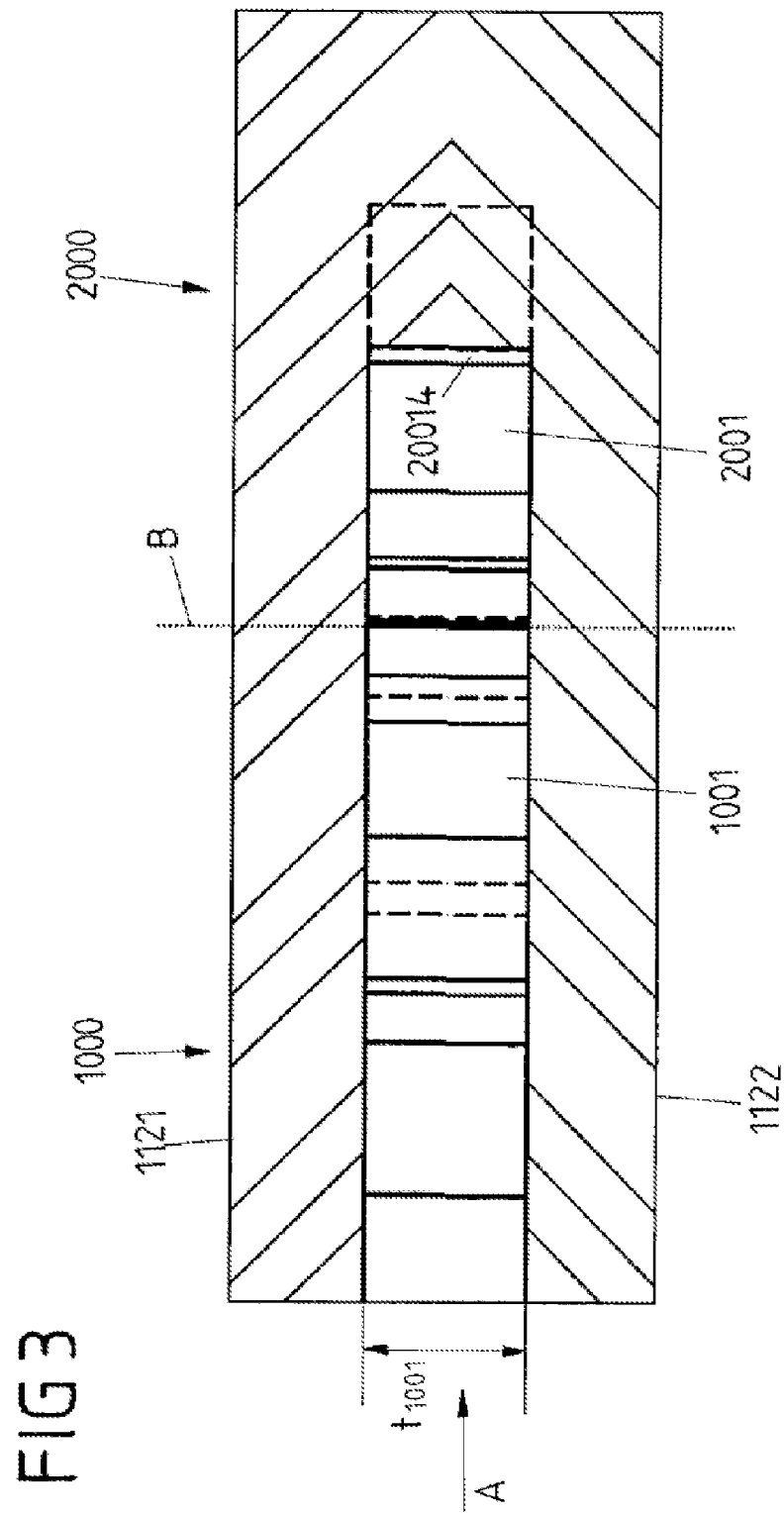
FIG. 3 shows a sectional representation through the fluidic component from FIG. 2 along the line A'-A"

In FIGS. 2 and 3, an embodiment of a fluidic component 112 according to the solution is represented. In this case, FIG. 2 is a sectional representation through the fluidic component 112 parallel to the oscillation plane of the fluidic component 112. FIG. 3 shows a sectional representation through the fluidic component from FIG. 2 perpendicularly to the oscillation plane along the line A'-A".

The fluidic component 112 comprises two subsystems 1000 and 2000, which are arranged one after the other in the direction of fluid flow and are fluidically connected to one another. The subsystems 1000 and 2000 may be formed in one piece or as individual elements. The subsystems 1000 and 2000 are imagined to be separated from one another in FIGS. 2 and 3 by a plane represented as a dotted line B. The first subsystem 1000 generates a fluid flow oscillating in an oscillation plane, and the second subsystem 2000 is designed and intended to separate off a part from the oscillating fluid flow that is generated by the first subsystem 1000 in order to generate from the oscillating fluid flow temporally separate fluid flow pulses of a defined pulse width b and with a defined pulse interval T.

The first subsystem 1000 of the fluidic component 112 comprises a flow chamber 1001, which can be flowed through by a fluid flow. As already mentioned, the fluid flow is provided by the fluid flow source 111. The flow chamber 1001 is also known as an interaction chamber.

The flow chamber 1001 comprises an inlet opening 10011, by way of which the fluid flow enters the flow chamber 1001, and an outlet opening 10012, by way of which the fluid flow exits from the flow chamber 1001. The inlet opening 10011 and the outlet opening 10012 are arranged on two opposite sides (in terms of flow) of the fluidic component 1001 between a front wall 1121 and a rear wall 1122. The front wall 1121 and the rear wall 1122 are aligned substantially parallel to one another and to the oscillation plane. The fluid flow moves in the flow chamber 1001 substantially along a longitudinal axis A of the subsystem 1000 of the fluidic component 112 (which connects the inlet opening 10011 and the outlet opening 10012 to one another) from the inlet opening 10011 to the outlet opening 10012. In this case, the inlet opening 10011 and the outlet opening 10012 are defined where the flow chamber 1001 has the smallest cross-sectional areas transversely to the direction of flow that the fluid flow passes when it enters the flow chamber 1001 or exits again from the flow chamber 1001. The inlet opening 10011 has an inlet width $b_{10011}$ and the outlet opening 10012 has an outlet width $b_{10012}$. These widths are defined in the oscillation plane substantially perpendicularly to the direction of fluid flow, that is to say perpendicularly to the longitudinal axis A.

The distance between the inlet opening 10011 and the outlet opening 10012 along the longitudinal axis A is the length $l_{1001}$ of the flow chamber 1001. The width $b_{1001}$ of the flow chamber 1001 is the maximum extent of the flow chamber 1001 in the oscillation plane transversely to the longitudinal axis A. The depth $t_{1001}$ of the flow chamber 1001 (FIG. 3) is the extent of the flow chamber 1001 transversely to the oscillation plane and transversely to the longitudinal axis A. The width $b_{1001}$ may lie in a range between 0.001 mm and 200 mm. In the case of a preferred variant of an embodiment, the width $b_{1001}$ lies between 0.02 mm and 10 mm. Based on the width $b_{1001}$, the length $l_{1001}$ preferably lies in the following range: $\frac{1}{3} \cdot b_{1001} \leq l_{1001} \leq 7 \cdot b_{1001}$.

The inlet width $b_{10011}$ is ⅓ to ⅟₃₀ of the width $b_{1001}$ of the flow chamber 1001, preferably ⅕ to ⅟₁₅. The outlet width $b_{10012}$ is ⅓ to ⅟₅₀ of the width $b_{1001}$ of the flow chamber 1001, preferably ⅓ to ⅟₂₀. The outlet width $b_{10012}$ is chosen in dependence on the volumetric throughflow, the depth $t_{1001}$ of the flow chamber 1001, the entry velocity of the fluid or the entry pressure of the fluid and the desired oscillation frequency of the exiting fluid flow. A preferred oscillation frequency range lies between 10 and 1000 kHz. The depth $t_{1001}$ of the flow chamber 1001 may be variable. A variable depth $t_{1001}$ allows the frequency of the ultrasonic signal generated to be set. The depth two, of the flow chamber 1001 may be changed for example by plunger-like displacement of the front wall 1121 and/or the rear wall 1122. Alternatively, the front wall 1121 and/or the rear wall 1122 may be elastically configured, so that they move into the flow chamber 1001 due to an external force effect.

The flow chamber 1001 comprises a main flow channel 10013, which extends centrally through the flow chamber 1001 of the fluidic component 112. The main flow channel 10013 extends substantially in a straight line along the longitudinal axis A, so that the fluid flow in the main flow channel 10013 flows substantially along the longitudinal axis A of the subsystem 1000 of the fluidic component 112.

At its downstream end, the main flow channel 10013 goes over into an outlet channel 10017, which, when viewed in the oscillation plane, tapers downstream and ends in the outlet opening 10012.

For forming an oscillation of the fluid flow at the outlet opening 10012 of the flow chamber 1001, the flow chamber 1001 comprises by way of example two secondary flow channels 10014a, 10014b. In this case, the main flow channel 10013 (when viewed in the oscillation plane and transversely to the longitudinal axis A) is arranged between the two secondary flow channels 10014a, 10014b. Directly downstream of the inlet opening 10011 of the flow chamber 1001, the flow chamber 1001 divides into the main flow channel 10013 and the two secondary flow channels 10014a, 10014b, which are then brought together directly upstream of the outlet opening 10012 of the flow chamber 1001. Here, by way of example, the two secondary flow channels 10014a, 10014b are formed identically and arranged symmetrically with respect to the longitudinal axis A. Alternatively, the secondary flow channels may not be formed symmetrically, as explained later in conjunction with FIG. 4.

In a first portion, the secondary flow channels 10014a, 10014b in each case extend from the inlet opening 10011 of the flow chamber 1001 initially at an angle of substantially 90° to the longitudinal axis A in opposite directions. Subsequently, the secondary flow channels 10014a, 10014b branch off, so that they in each case extend substantially parallel to the longitudinal axis A (in the direction of the outlet opening 10012 of the flow chamber 1001) (second portion). In order to bring together the secondary flow channels 10014a, 10014b and the main flow channel 10013 again, the secondary flow channels 10014a, 10014b change their direction once again at the end of the second portion, so that they are in each case directed substantially in the direction of the longitudinal axis A (third portion). In the embodiment of FIG. 2, the direction of the secondary flow channels 10014a, 10014b changes at the transition from the second portion into the third portion by an angle of about 120°. However, angles other than those stated here may also be chosen for the change in direction between these two portions (and between the first portion and the second portion) of the secondary flow channels 10014a, 10014b.

The secondary flow channels 10014a, 10014b are a means for influencing the direction of the fluid flow that flows through the flow chamber 1001, and ultimately a means for forming an oscillation of the fluid flow at the outlet opening 10012 of the flow chamber 1001. The secondary flow channels 10014a, 10014b each have for this an entrance 10014a1, 10014b1, which is formed by the end of the secondary flow channels 10014a, 10014b that is facing the outlet opening 10012, and in each case an exit 10014a2, 10014b2, which is formed by the end of the secondary flow channels 10014a, 10014b that is facing the inlet opening 10011. Through the entrances 10014a1, 10014b1, a small part of the fluid flow, the secondary flows, flows into the secondary flow channels 10014a, 10014b. The remaining part of the fluid flow (the so-called main flow) exits from the first subsystem 1000 of the fluidic component 112 by way of the outlet opening 10012 of the flow chamber 1001. The secondary flows exit from the secondary flow channels 10014a, 10014b at the exits 10014a2, 10014b2, where they can exert a lateral pulse (transversely to the longitudinal axis A) on the fluid flow entering through the inlet opening 10011 of the flow chamber 1001. In this case, the direction of the fluid flow is influenced in such a way that the main flow exiting at the outlet opening 10012 of the flow chamber 1001 is spatially and/or temporally oscillated. The oscillation takes place in one plane, the so-called oscillation plane. The oscillating fluid flow moves within the oscillation plane between two maximum deflections, which form the so-called oscillation angle.

In the embodiment from FIG. 2, the main flow channel 10013 and the secondary flow channels 10014a, 10014b are arranged in the oscillation plane. The secondary flow channels may however also be arranged outside the oscillation plane. These secondary flow channels may for example be realized by means of tubes outside the oscillation plane or by channels that run at an angle to the oscillation plane. Also, one or more additional secondary flow channels may be provided, arranged such that they form a direct connection from the fluid flow source 111 or from the region around the inlet opening 10011 of the flow chamber 1001 to the entrance 10014a1, 10014b1 of the secondary flow channels 10014a, 10014b (or to the region around the entrance 10014a1 or 10014b1), in order in this way to internally generate a counterpressure there. This measure allows the pulse interval T to be adapted.

In the variant of an embodiment represented here, the secondary flow channels 10014a, 10014b have in each case a cross-sectional area (transversely to the direction of fluid flow of the fluid flowing through the secondary flow channels) which is virtually constant over the entire length (from the respective entrance 10014a1, 10014b1 up to the respective exit 10014a2, 10014b2) of the secondary flow channels 10014a, 10014b. However, the cross-sectional areas may also not be constant. The effect of a cross-sectional area that is not constant is described later. By contrast, the size of the cross-sectional area of the main flow channel 10013 in the direction of flow of the main flow (that is to say in the direction from the inlet opening 10011 to the outlet opening 10012) increases substantially steadily.

Figure 4:
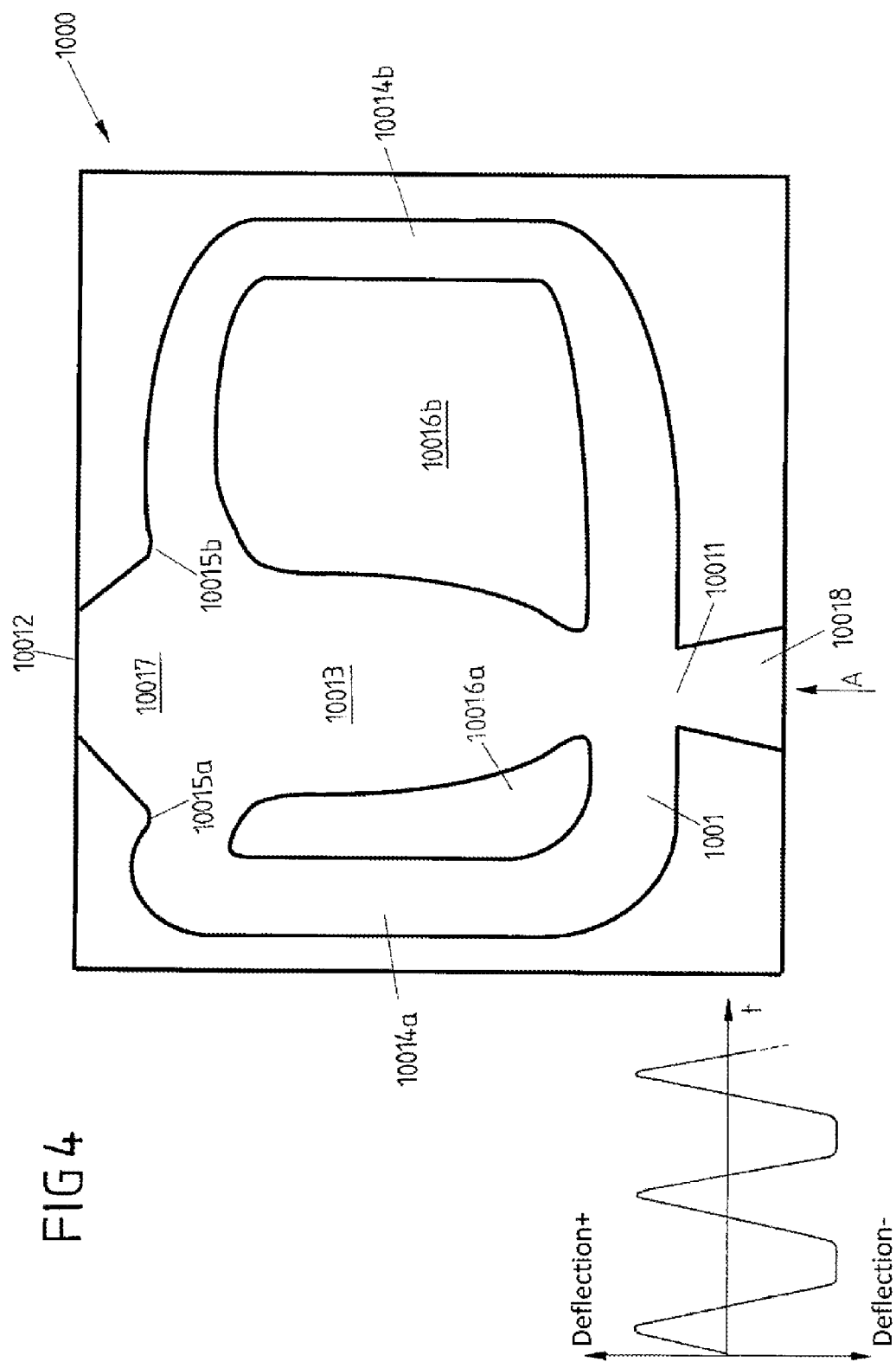
FIG. 4 shows a sectional representation through a flow chamber of a fluidic component according to a further embodiment of the solution.

The main flow channel 10013 is separated from each secondary flow channel 10014a, 10014b by an inner block 10016a, 10016b. In the embodiment from FIG. 2, the two blocks 10016a, 10016b are identical in form and size and arranged symmetrically with respect to the longitudinal axis A. In principle, however, they may also be designed differently and/or not be aligned symmetrically. An example of this is represented in FIG. 4. In the case of a non-symmetrical alignment of the blocks 10016a, 10016b, the form of the main flow channel 10013 is also not symmetrical with respect to the longitudinal axis A.

The form of the blocks 10016a, 10016b, which is represented in FIG. 2, is only given by way of example and can be varied. The blocks 10016a, 10016b from FIG. 2 have rounded edges. Thus, the blocks 10016a, 10016b have at their end that is facing the inlet opening 10011 of the flow chamber 1001 and the main flow channel 10013 in each case a radius 10019a, 10019b. The edges may also not be rounded or have radii with the value approaching zero. Downstream, the distance of the two inner blocks 10016a, 10016b from one another steadily increases along the width $b_{1001}$ of the flow chamber 1001, so that (when viewed in the oscillation plane) they form a wedge-shaped main flow channel 10013. The smallest distance of the two inner blocks 10016a, 10016b from one another is in principle at the upstream end of the inner blocks 10016a, 10016b. On account of the radii 10019a, 10019b, the smallest distance shifts slightly downstream. The width of the main flow channel 10013 at its narrowest location (between the blocks 10016a, 10016b) is greater than the width $b_{10011}$ of the inlet opening 10011 of the flow chamber 1001.

The form of the main flow channel 10013 is formed in particular by the inwardly facing (in the direction of the main flow channel 10013) surfaces of the blocks 10016a, 10016b, which extend substantially perpendicularly to the oscillation plane. The inwardly facing surfaces may have a (slight) curvature or be formed by one or more radii, a polynomial and/or one or more planar surfaces or by a mixed form thereof.

Provided at the entrance 10014a1, 10014b1 of the secondary flow channels 10014a, 10014b are separators 10015a, 10015b in the form of indentations (which protrude into the flow chamber). From the perspective of the flow, the separators are convex. In this case, at the entrance 10014a1, 10014b1 of each secondary flow channel 10014a, 10014b, in each case one indentation 10015a, 10015b protrudes beyond a portion of the circumferential edge of the secondary flow channel 10014a, 10014b into the respective secondary flow channel 10014a, 10014b and, at this location, changes the cross-sectional form of the cross-sectional area while reducing it in size. In the embodiment from FIG. 2, the portion of the circumferential edge has been chosen such that each indentation 10015a, 10015b is (inter alia also) directed toward the inlet opening 10011 of the flow chamber 1001 (aligned substantially parallel to the longitudinal axis A). Depending on the application, the separators 10015a, 10015b may be aligned differently or else omitted completely. It is also possible for a separator 10015a, 10015b to be provided only at one of the secondary flow channels 10014a, 10014b. In this way, the pulse interval T and the pulse width b can be set. The separating off of the secondary flows from the main flow is influenced and controlled by the separators 10015a, 10015b. The amount of fluid that flows into the secondary flow channels 10014a, 10014b, and also the direction of the secondary flows, can be influenced by the form, size and alignment of the separators 10015a, 10015b. This leads in turn to influencing of the exit angle of the main flow (and consequently to influencing of the oscillation angle) at the outlet opening 10012 of the flow chamber 1001 (that is to say of the first subsystem 1000 of the fluidic component 112) and also the frequency with which the main flow oscillates at the outlet opening 10012. By choosing the size, orientation and/or form of the separators 10015a, 10015b, consequently the profile of the fluid flow exiting at the outlet opening 10012 of the flow chamber 1001, and consequently the pulse width b of the subsequently generated fluid flow pulse, can be specifically influenced. It is particularly advantageous if the separators

10015a, 10015b (when viewed along the longitudinal axis A) are arranged downstream of the position where the main flow detaches from the inner blocks 10016a, 10016b and part of the fluid flow enters the secondary flow channels 10014a, 10014b.

The secondary flow channels are only an example of a means for forming the oscillation of the exiting fluid flow. Other means known from the prior art for forming the oscillation of the exiting fluid flow may also be used, for example means which generate an oscillation by means of colliding fluid jets or by interacting vortices or areas of recirculation, or other means for forming an oscillation of the fluid flow without secondary flow channels. In particular, the fluidic component may be a so-called feedback-free oscillator. Fluidic components with secondary flow channels as a means for forming the oscillation of the exiting fluid flow have the advantage that, reliably, an oscillating fluid flow with an oscillation frequency of over 20 kHz can be generated.

The inlet opening 10011 of the flow chamber 1001 is preceded upstream by a funnel-shaped extension 10018, which tapers (in the oscillation plane) in the direction of the inlet opening 10011 (downstream). The boundary walls of the funnel-shaped extension 10018, which extend substantially perpendicularly to the oscillation plane, form an angle c. Also upstream of the outlet opening 10012, the flow chamber 1001 tapers (in the oscillation plane). The tapering is formed by the already mentioned outlet channel 10017, which extends between the entrances 10014a1, 10014b1 of the secondary flow channels 10014a, 10014b and the outlet opening 10012 of the flow chamber 1001. In FIG. 2, the entrances 10014a1, 10014b1 of the secondary flow channels 10014a, 10014b are dictated by the separators 10015a, 10015b. The boundary walls of the outlet channel 10017, which extend substantially perpendicularly to the oscillation plane, form an angle δ.

According to FIG. 2, the funnel-shaped extension 10018 and the outlet channel 10017 taper in such a way that only their width, that is to say their extent in the oscillation plane perpendicularly to the longitudinal axis A, in each case decreases downstream. In addition, the funnel-shaped extension 10018 and the outlet channel 10017 may also taper downstream along the depth $t_{1001}$ of the flow chamber 1001, that is to say perpendicularly to the oscillation plane and perpendicularly to the longitudinal axis A. Furthermore, only the extension 10018 may taper in depth or in width, while the outlet channel 10017 tapers both in width and in depth, and vice versa. The extent of the tapering of the outlet channel 10017 influences the directional characteristics of the fluid flow exiting from the outlet opening 10012 of the flow chamber 1001. The form of the funnel-shaped extension 10018 and of the outlet channel 10017 are shown merely by way of example in FIG. 2. Here, their width in each case decreases linearly downstream. Other forms of the tapering are possible.

The outlet opening 10012 of the flow chamber 1001 is rounded by a radius 10019. The radius 10019 is unequal to 0. In other embodiments, the radius 10019 may be equal to 0, so that the outlet opening 10012 is sharp-edged.

The inlet opening 10011 and the outlet opening 10012 have in each case a rectangular cross-sectional area (transversely to the longitudinal axis A). These have in each case the same depth two, (to be specific the depth of the flow chamber 1001), but differ in their width $b_{10011}$, $b_{10012}$. Alternatively, a non-rectangular cross-sectional area, for example circular, is also conceivable for the inlet opening 10011 and the outlet opening 10012.

With the first subsystem 1000, an oscillating fluid flow, which oscillates with a certain oscillation frequency in an oscillation plane between two maximum deflections that form the oscillation angle, is generated at the outlet opening 10012 of the flow chamber 1001. The oscillation frequency has a great influence on the pulse interval T between the fluid flow pulses that are generated by means of the second subsystem 2000.

Downstream of the first subsystem 1000, the second subsystem 2000 is arranged. The second subsystem 2000 of the fluidic component 112 may also be referred to as a separation device. The separation device 2000 comprises a separation chamber 2001 with an inlet opening 20011, a first outlet opening 20012 and a second outlet opening 20013. In principle, the separation chamber 2001 may also have more than two outlet openings. The outlet opening 10012 of the flow chamber 1001 corresponds here to the inlet opening 20011 of the separation chamber 2001. The first and second outlet openings 20012, 20013 are formed as outlet channels, which protrude out of the separation chamber 2001.

The oscillating fluid flow enters the separation chamber 2001 through the inlet opening 20011. In each case, a part of the fluid flow exits from the separation device 2000 through the first outlet opening 20012 and the second outlet opening 20013. Provided between the first outlet opening 20012 and the second outlet opening 20013 is a flow divider 20014, which deflects the oscillating fluid flow alternately into the first and second outlet openings 20012, 20013 of the separation device 2000. Since the flow divider 20014 distributes an oscillating fluid flow in two spatially separated outlet openings 20012, 20013, in each case fluid flow pulses are generated. Preferably, the rate of the fluid flow within an outlet opening 20012, 20013 is periodically for a short time approximately 0 or is greatly reduced (by for example 75% of the maximum velocity). It is particularly advantageous if the direction of flow of the fluid changes periodically for a short time, that is to say the sign of the velocity field in the direction of fluid flow changes periodically for a short time.

As a consequence, the part of the fluid flow that can be used for example for a measurement exits from the first outlet opening 20012 in the form of an ultrasonic signal. The residual signal, which is not necessarily used for the measurement, escapes from the second outlet opening 20013. Acoustic attenuating materials or attenuating systems are provided in the second outlet channel 20013 (for example on its inner surface), in order to attenuate the residual signal and increase the quality of the measurement to which the ultrasonic signal from the first outlet opening 20012 can be made available.

In the embodiment represented in FIG. 2, approximately half of the fluid flow flowing into the separation chamber 2001 through the inlet opening 20011 flows through the first outlet opening 20012. The remaining part of the fluid flow flows out of the separation device 2000 through the second outlet opening 20013. The residual signal exiting from the second outlet opening may however also be passed on to a use. For example, the fluid flow pulses exiting from the second outlet opening 20013 may be used as a trigger signal and be deflected to the receiver 12 of the ultrasonic measurement device 1. The detected trigger signal may be used by the signal processing unit 13. Another possibility for tapping a trigger signal that indicates when an ultrasonic signal is given off by the first outlet opening 20012 can be created by a measurement device which is for example arranged within the flow chamber 1001 of the first subsystem 1000, for example in one of the secondary flow channels 10014a, 10014b. The residual signal exiting from the second outlet opening 20013 may however also be used for measurements, in particular in another spatial direction.

The first outlet channel 20012 and the second outlet channel 20013 are formed in such a way that the part of the fluid flow that exits from the first outlet channel 20012 and the part of the fluid flow that exits from the second outlet channel 20013 of the separation device are in each case directed along an axis $R_1$, $R_2$, the axes $R_1$, $R_2$ diverging in the direction of fluid flow. In the embodiment from FIG. 2, the two axes $R_1$, $R_2$ form an angle of substantially 90° with one another. Other angles are possible.

In this variant of an embodiment, the separation chamber 2001 is formed as divergent in the direction of fluid flow. The form and size of the separation chamber 2001 may be designed such that vortices are generated in the separation chamber 2001, in order thus to specifically set the pulse width b and the pulse interval T of the fluid flow pulses that exit from the separation chamber 2001 through the first outlet opening 20012. Configurations of the separation chamber 2001 that are suitable for generating vortices are discussed later. The vortices may be generated by the form of the separation chamber 2001 alone, or in interaction with the flow divider 20014. The vortices assist the reduction in velocity or reversal of velocity of the fluid flows in the outlet openings 20012, 20013. As a result, the formation of a binary flow pattern in the outlet openings 20012, 20013 can be assisted, and in this way a sequence of fluid flow pulses can be generated with pulses which have a pulse increase that is as steep as possible and a small pulse width b.

For setting the desired pulse width b of the fluid flow pulses which exit from the separation chamber 2001 through the first outlet opening 20012, the width (extent in the oscillation plane and transversely to the direction of fluid flow) of the first outlet opening 20012 and the depth (extent transversely to the oscillation plane) of the first outlet opening 20012 may be changed. The width and depth of the first outlet opening 20012 are defined here at the location of the channel-shaped outlet opening 20012, where the cross-sectional area of the channel transversely to the direction of flow is at the smallest. For setting the pulse width, the width and the depth of the channel at its downstream end may also be changed. The smaller the stated widths and depths are chosen, the smaller the pulse width b is.

The pulse interval T and also the pulse width b are partly determined by the position of the flow divider 20014. Thus, the distance 12001 (along the longitudinal axis A) between the inlet opening 20011 of the separation chamber 2001 and the flow divider 20014 may be varied in order to adapt the pulse width b. In this case, the flow divider 20014 may be displaced with respect to the inlet opening 20011 within the oscillation plane, that is to say change its position. The displacement may take place exclusively along the longitudinal axis A, exclusively transversely to the longitudinal axis A or both along and transversely to the longitudinal axis A. Moreover, the flow divider 20014 may be turned by an angle κ about an axis which extends perpendicularly to the oscillation plane and is located in the middle of the inlet opening 20011 of the separation chamber 2001. Such a rotation of the flow divider 20014 and displacement in the oscillation plane is represented in FIG. 2 by a dotted line. By rotation of the flow divider 20014 by the angle κ while the distance 12001 between the inlet opening 20011 of the separation chamber 2001 and the flow divider 20014 remains the same, the pulse interval T is increased and generally the pulse width b is reduced, and vice versa, in dependence on the oscillation behavior over time of the fluidic component 112. How the pulse width b specifically changes in this case is dependent substantially on the oscillation of the fluid flow exiting at the outlet opening 10012/entering at the inlet opening 20011.

The flow divider 20014 may be variously designed. The embodiment of the flow divider 20014 that is represented in FIG. 2 generates a substantially binary or digital flow pattern. Here, the fluid flow divider 20014 has a surface or wall that is curved outwardly in the direction of fluid flow. Alternatively, the flow divider 20014 may have a (sharp or rounded) wedge with an edge, which protrudes into the separation chamber 2001 counter to the direction of fluid flow.

In FIG. 4, a sectional representation of a first subsystem 1000 according to a further embodiment is represented. This subsystem 1000 may be used in combination with a second subsystem 2000 (for example the second subsystem 2000 from FIG. 2) as a fluidic component for generating an ultrasonic signal for an ultrasonic measurement device 1. In the case of this embodiment, a preferred oscillation frequency range lies between 10 and 2000 Hz. By combination with the subsystem 2000, a high-frequency excitation signal can be generated from an oscillating fluid flow with a low oscillation frequency. The first subsystem 1000 from FIG. 4 differs from the first subsystem 1000 from FIG. 2 in particular in that the flow chamber 1001 is not symmetrical with respect to the longitudinal axis A. Thus, the one secondary flow channel 10014b (represented on the right in FIG. 4) is longer than the other secondary flow channel 10014a (represented on the left in FIG. 4). In order to achieve this, the inner blocks 10016a, 10016b are differently formed. In particular, the one inner block 10016b (represented on the right in FIG. 4) is larger than the other inner block 10016a (represented on the left in FIG. 4). A regular complex oscillation is generated at the outlet opening 10012 of the flow chamber 1001 from FIG. 4. The fluid flow does not oscillate uniformly over the course of time. Rather, the fluid flow is at the one (maximum) deflection (for example on the right-hand side) only for a short time, while it is at the other (maximum) deflection (for example on the left-hand side) for relatively longer. The position of the oscillating fluid flow between the two maximum deflections (+ and −) in dependence on time t is schematically represented in a diagram in FIG. 4. The ratio $X_T$ of the dwell time at the other (maximum) deflection to the dwell time at the one (maximum) deflection substantially determines the pulse interval T. There is an approximately proportional relationship between the pulse interval T and the factor $X_T$.

The factor $X_T$ is influenced by multiple geometrical parameters of the flow chamber 1001, in particular by the length (extent between the entrance 10014a1, 10014b1 and the exit 10014a2, 10014b2 along the direction of fluid flow), width (extent in the oscillation plane and transversely to the direction of fluid flow) and depth (extent transversely to the oscillation plane) of the secondary flow channels 10014a, 10014b, the form of the secondary flow channels 10014a, 10014b or the form of the inwardly facing (toward the main flow channel 10013) surfaces of the inner blocks 10016a, 10016b. The factor $X_T$ (and consequently the pulse interval T) is in this case proportional to the length ratio of the two secondary flow channels 10014a, 10014b.

Depending on the application area, different pulse intervals T are required. In order to increase the length ratio of the two secondary flow channels 10014a, 10014b without massively changing the outer installation space of the secondary flow channels 10014a, 10014b or the width $b_{1001}$ of the flow chamber 1001, one of the two secondary flow channels 10014a, 10014b may be designed in a meandering form, in order in this way to increase the path length for the fluid flowing through. Furthermore, the factor $X_T$ may be increased, in that additional resistances or turbulators or else swirl chambers are formed in one of the two secondary flow channels 10014a, 10014b.

To be able to use the ultrasonic signal generated by the fluidic component for a distance determination, it is advantageous if the length ratio of the two secondary flow channels 10014a, 10014b is at least 2 and in particular at least 5. However, the length ratio of the two secondary flow channels 10014a, 10014b may also be much greater than 2000. It should be noted in this respect that the pulse width b and the pulse interval T also depend on the configuration of the second subsystem 2000.

Also, the pulse interval T and the pulse width b may be set by a series connection of first subsystems 1000 and/or fluidic components 112. Here, the outlet opening 10012 (20012) of a first subsystem 1000 (of a fluidic component 112) may be fluidically connected to the inlet opening 10011 of a further first subsystem 1000 or fluidic component 112, and so on.

Furthermore, the pulse interval T may be set by displacement of the outlet opening 10012 in the oscillation plane and transversely to the direction of fluid flow (transversely to the longitudinal axis A), for example to the left-hand side. As a result, the oscillation behavior over time of the fluid flow can be changed to the extent that the previously mentioned regular complex oscillation can be generated.

Figure 5:
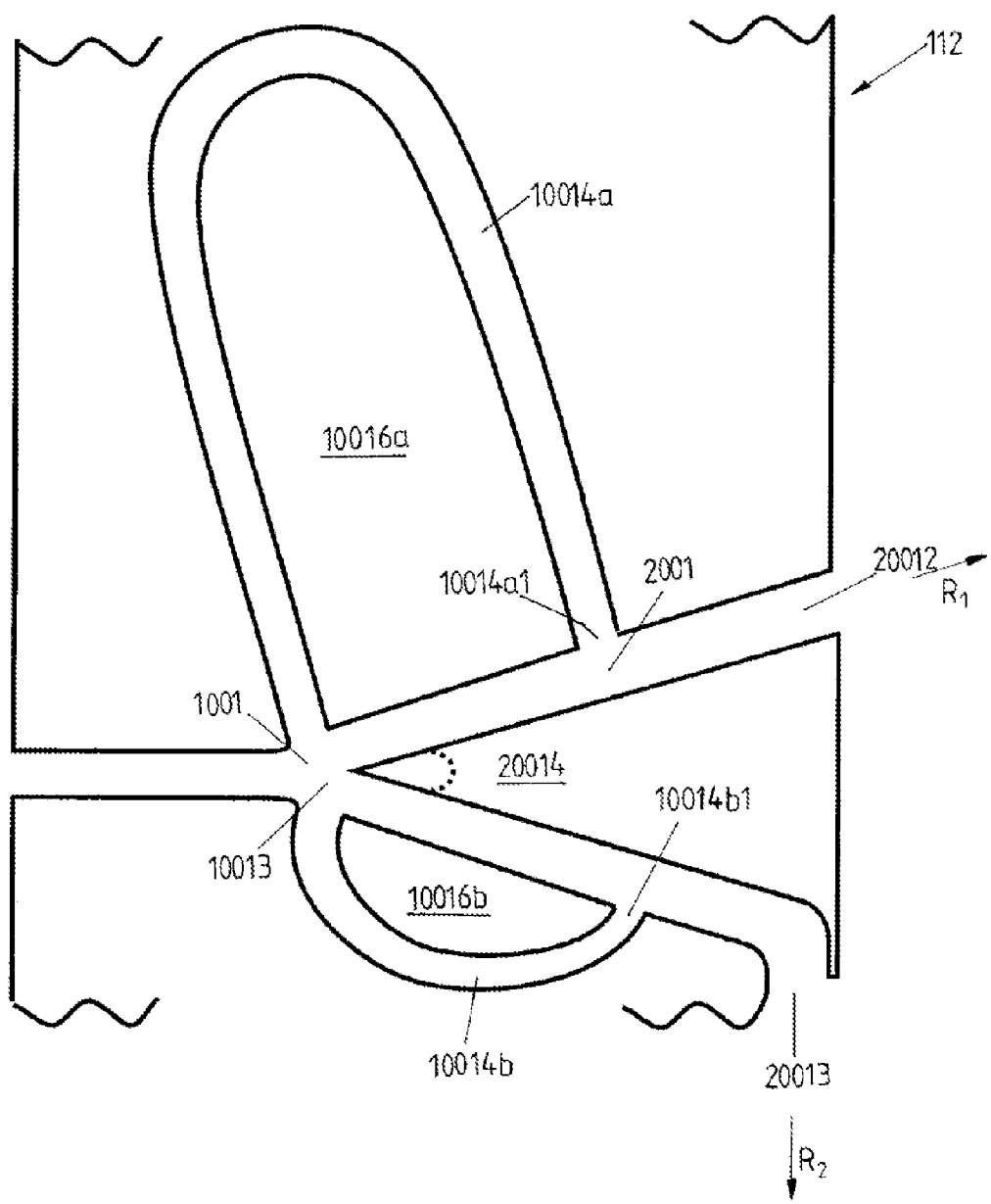
FIG. 5 shows a sectional representation through a fluidic component according to a further embodiment of the solution.

In FIG. 5, a sectional representation through a fluidic component 112 according to a further embodiment is represented. The fluidic component 112 from FIG. 5 differs from the fluidic component 112 from FIG. 2 in particular in that the second subsystem 2000 protrudes into the first subsystem 1000. Specifically, the flow divider 20014 of the second subsystem 2000 protrudes into the flow chamber 1001 of the first subsystem 1000. Here, the entrances 10014a1, 10014b1 of the secondary flow channels 10014a, 10014b do not branch off from the main flow channel 10013 of the flow chamber 1001, but from the separation chamber 2001.

The flow divider 20014 may have forms that deviate from the configuration in FIG. 5; for example, it may be designed like the flow divider 20014 from FIG. 2. As in the embodiment from FIG. 4, the secondary flow channels 10014a, 10014b are of different lengths. The statements made in this connection in relation to FIG. 4 apply correspondingly to the secondary flow channels 10014a, 10014b from FIG. 5.

The first outlet opening 20012 and the second outlet opening 20013 of the separation chamber 2001 are in each case formed here as a channel. In this case, the two channels 20012, 20013 are formed and aligned in such a way that the part of the fluid flow that exits from the first outlet opening 20012 of the separation device 2000 and the part of the fluid flow that exits from the second outlet opening 20013 of the separation device 2000 are in each case directed along an axis $R_1$, $R_2$, the axes $R_1$, $R_2$ forming an angle of over 90°.

Figure 6:
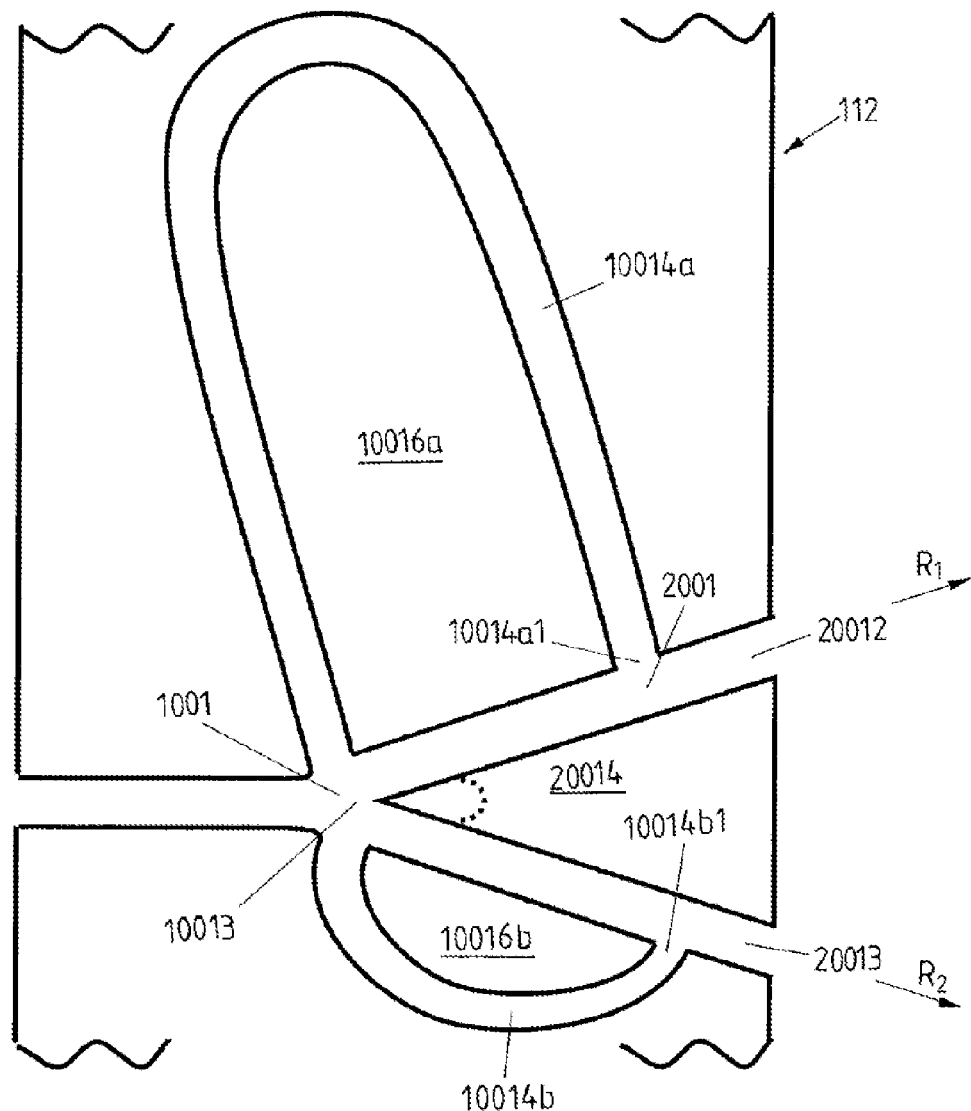
FIG. 6 shows a sectional representation through a fluidic component according to a further embodiment of the solution.

The embodiment from FIG. 6 corresponds substantially to the embodiment from FIG. 5 and differs from the latter only in the alignment of the axes $R_1$, $R_2$. Thus, the axes $R_1$, $R_2$ in the embodiment from FIG. 6 form an angle of below 90° (between 0° and 90°).

Figure 7:
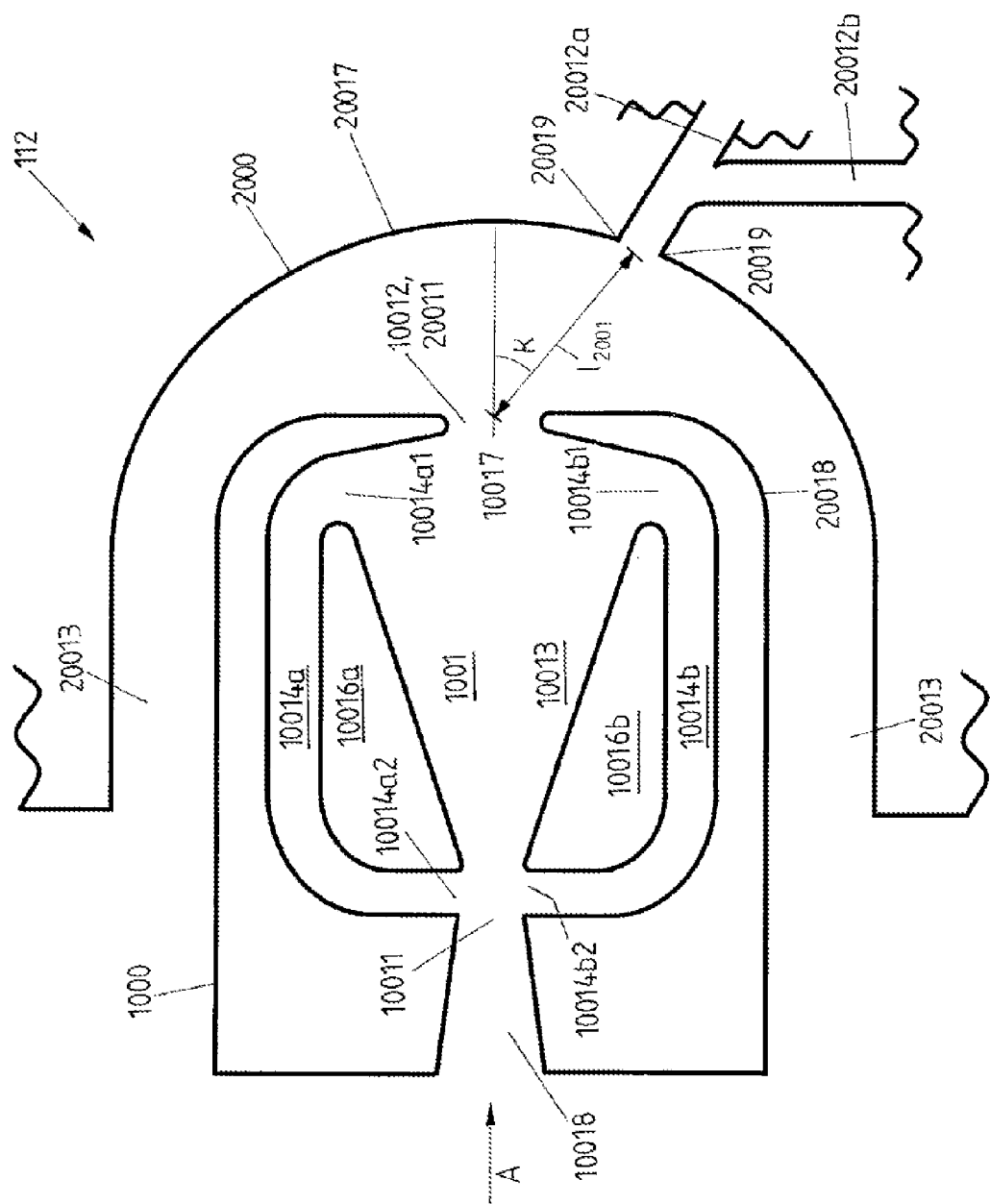
FIG. 7 shows a sectional representation through a fluidic component according to a further embodiment of the solution.

In FIG. 7, a sectional representation through a further embodiment of the fluidic component 112 is represented. In the case of this embodiment, a preferred oscillation frequency range lies between 10 and 2000 Hz. This fluidic component 112 may also be embodied as a settable fluidic component 112. The fluidic component 112 substantially comprises a first subsystem 1000 and a second subsystem 2000. The second subsystem 2000 differs from those from FIGS. 2, 5 and 6 in particular in that the separation chamber 2001 has more than two outlet openings, here specifically four outlet openings 20012a, 20012b, 20013. Any number of outlet openings other than four is also possible.

Here, too, the oscillating fluid flow flows out of the outlet opening 10012 of the flow chamber 1001 of the first subsystem 1000 into the separation chamber 2001 of the second subsystem 2000 (of the separation device). The outlet opening 10012 of the flow chamber 1001 corresponds to the inlet opening 20011 of the separation chamber 2001. The separation chamber 2001 is bounded by boundary walls 20017 and 20018, which in each case extend substantially perpendicularly to the oscillation plane. Optionally, the separation chamber 2001 may also be bounded by a lower boundary wall and/or an upper boundary wall, which extend/extends substantially parallel to the oscillation plane. Here, too, the separation chamber 2001 may be designed such that secondary flows are specifically generated there in the form of vortices. These vortices may be generated by cavities or protuberances in the boundary walls 20017 and/or 20018. Another possibility for the specifically directed generation of vortices is to use so-called turbulators, which are provided on the boundary walls 20017 and/or 20018.

The inlet opening 20011 of the separation chamber 2001 is formed as an interruption in the first boundary wall 20018. The second boundary wall 20017, which is arranged at a distance from the inlet opening 20011 of the separation chamber 2001 (and is concavely curved from the viewpoint of the fluid), also forms here the flow divider. In the second boundary wall 20017 there is formed an interruption which opens out into a first channel-shaped outlet opening 20012a. A part of the oscillating fluid flow is deflected into the first channel-shaped outlet opening 20012a and forms there an ultrasonic signal with a defined pulse width b and a defined pulse interval T. Through this first channel-shaped outlet opening 20012a, the generated ultrasonic signal exits from the separation device 2000 and can for example be made available for a measurement or else be used for providing a trigger signal. This interruption in the second boundary wall 20017 is arranged at a distance $l_{2001}$ (here not along the longitudinal axis) from the inlet opening 20011 of the separation chamber 2001. Moreover, this interruption is displaced from the longitudinal axis A, so that the distance $l_{2001}$ forms an angle κ with the longitudinal axis A. By changing the position of the first channel-shaped outlet opening 20012a, that is to say by changing the angle κ and the distance $l_{2001}$, while retaining the first subsystem 1000, substantially the pulse interval T can be set. At the upstream end of the first channel-shaped outlet opening 20012a, a radius 20019 can be formed. The form of the ultrasonic pulse (that is to say the intensity of the pulse in dependence on time) can be influenced by the size of the radius 20019. The smaller the radius 20019 is, the quicker the intensity of the pulse increases, that is to say the steeper the increase of the pulse becomes. Accordingly, the pulse width b falls.

The first channel-shaped outlet opening 20012a has a width (extent in the oscillation plane and transversely to the direction of fluid flow) and a depth (extent transversely to the oscillation plane). The first channel-shaped outlet opening 20012a and also its cross-sectional area may be formed as desired. Thus, the cross-sectional area may for example be rectangular. A substantially round cross-sectional area, in particular also at the downstream end of the first channel-shaped outlet opening 20012a, is advantageous. Generally, a round cross-sectional area, at least for the first outlet opening 20012 of the separation chamber 2001, through which the useful signal exits, is advantageous for all of the embodiments of the separation device 2000. By changing the width and the depth of the first channel-shaped outlet opening 20012*a*, in particular the pulse width b of the fluid flow flowing through the first channel-shaped outlet opening 20012*a* can be set. In this case, the width of the first channel-shaped outlet opening 20012*a* should be in particular less than or equal to 150% of the width of the inlet opening 20011 of the separation chamber 2001, preferably less than or equal to the width of the inlet opening 20011 of the separation chamber 2001, and particularly preferably less than or equal to 75% of the width of the inlet opening 20011 of the separation chamber 2001. In this case, the width of the first channel-shaped outlet opening 20011*a* is defined at the location with the smallest cross-sectional area that the fluid flows through when it flows through the first channel-shaped outlet opening 20012*a*.

According to one embodiment, the position of the first channel-shaped outlet opening 20012*a* is settable, so that the pulse interval T can be set for the desired application area. According to a further embodiment, the cross-sectional form and the cross-sectional size of the first channel-shaped outlet opening 20012*a* are settable (altogether, at the downstream end or at the upstream end), so that the desired pulse width b can be set.

In the variant of an embodiment represented here, a further first channel-shaped outlet opening 20012*b* branches off from the first channel-shaped outlet opening 20012*a*. Through the further first channel-shaped outlet opening 20012*b*, a part of the useful signal can be deflected in a direction other than the direction which is defined by the first channel-shaped outlet opening 20012*a*. Thus, the useful signal exiting there can be used for another measuring direction. The width and depth of this further first channel-shaped outlet opening 20012*b* may also be different than in the case of the first channel-shaped outlet opening 20012*a*, so that the useful signal exiting there has a (slightly) deviating pulse interval T and a (slightly) deviating pulse width b. Alternatively, the further first channel-shaped outlet opening 20012*b* may be used for providing a trigger signal.

Furthermore, the separation chamber 2001 has two second outlet openings 20013, through which in each case a residual signal can escape along the longitudinal axis A in a direction opposite to the direction of fluid flow prevailing in the flow chamber 1001.

It is also conceivable that the separation chamber 2001 has multiple first (channel-shaped) outlet openings 20012, which can in each case be used for different measuring directions, for generating an ultrasonic signal with different pulse intervals T and/or pulse widths b and also for giving off a trigger signal. The directional characteristics can be influenced by the number and direction of the multiple first channel-shaped outlet openings 20012.

The first subsystem 1000 has differently formed inner blocks 10016*a*, 10016*b* in comparison with the first subsystem 1000 of FIGS. 2 to 6, whereby the form of the main flow channel 10013 also changes. Moreover, the first subsystem 1000 from FIG. 7 (in comparison with the first subsystem 1000 from FIG. 2) has no separators. The first subsystem 1000 from FIG. 7 is exchangeable as a result of a different embodiment of the first subsystem 1000.

Figure 8:
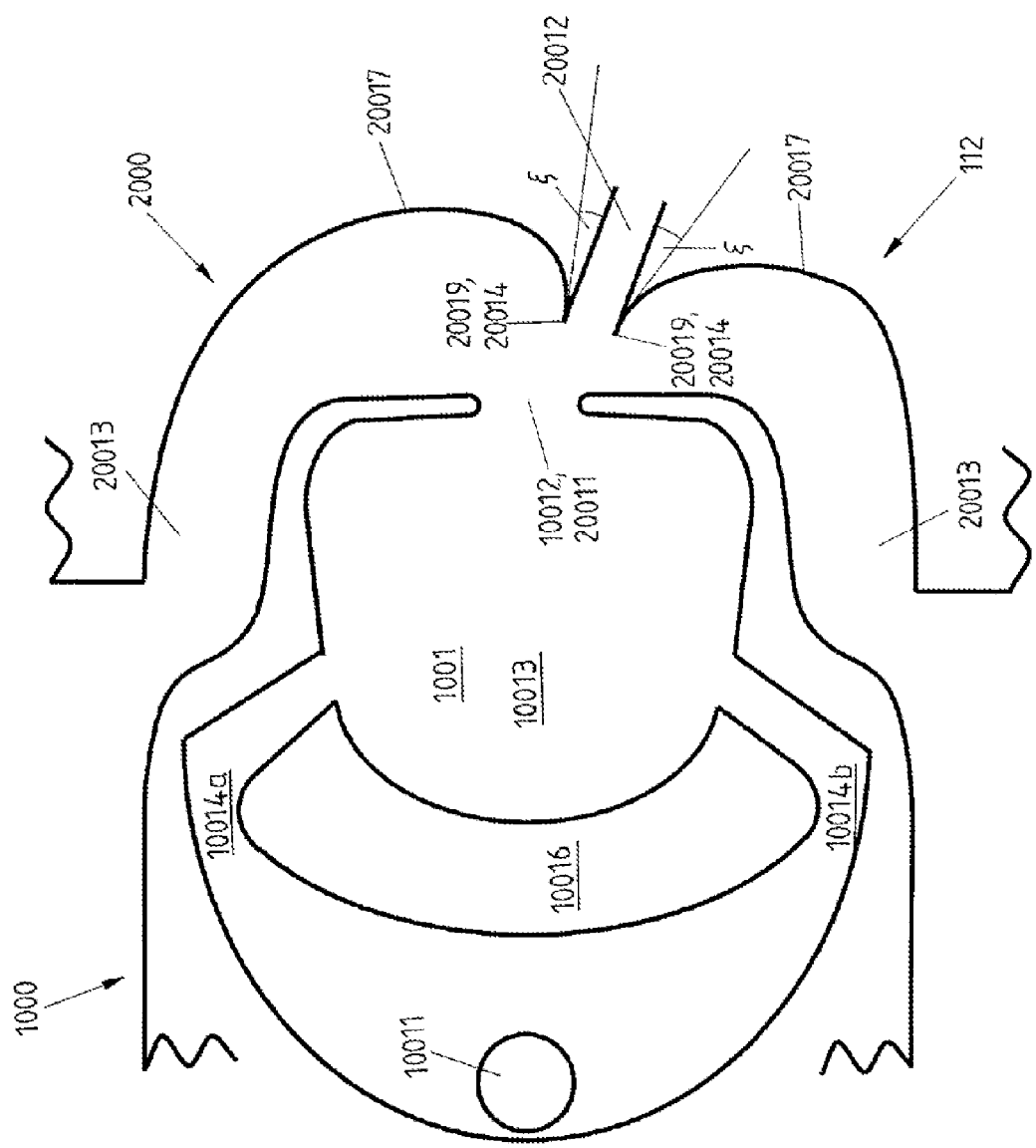
FIG. 8 shows a sectional representation through a fluidic component according to a further embodiment of the solution.

In FIG. 8, a sectional representation of a fluidic component 112 according to a further embodiment is represented. This fluidic component 112 comprises a different first subsystem 1000 than the embodiments of the previous figures. In the case of the first subsystem 1000 from FIG. 8, the means for forming an oscillation is formed by two secondary flow channels 10014*a*, 10014*b*, which are directly connected to the inlet opening 10011 and are separated from one another by an inner block 10016. These secondary flow channels 10014*a*, 10014*b* generate two separate fluid jets, which are aligned by the form of the secondary flow channels 10014*a*, 10014*b* such that they meet in the flow chamber 1001 and generate there an oscillating fluid jet, which exits from the flow chamber 1001 at the outlet opening 10012 of the flow chamber 1001. In principle, the various first subsystems 1000 of the different embodiments are interchangeable.

The second subsystem 2000 resembles the second subsystem 2000 from FIG. 7, differing from the latter in particular in that the second boundary wall 20017 (which also forms the flow divider) is not continuous with an interruption (for the formation of the first channel-shaped outlet opening 20012), but that the second boundary wall 20017 has two curved surfaces, which are in each case curved outwardly (from the viewpoint of the fluid flow), and between which the first channel-shaped outlet opening 20012 is formed. At its upstream end, the first channel-shaped outlet opening 20012 in each case forms with the curved surfaces of the second boundary wall 20017 an angle which in this embodiment is very acute. As a result, a sharp edge 20019 is in each case formed at the upstream end of the first channel-shaped outlet opening 20012 with the curved surfaces of the second boundary wall 20017. As already explained in connection with FIG. 7, by this edge 20019, on the one hand the increase of the pulse and on the other hand the pulse width b are influenced. Thus, the angle which is defined by the first channel-shaped outlet opening 20012 and the second boundary wall 20017, should be less than 95°, preferably less than 70° and in particular preferably less than 45°. The edge 20019 forms a flow divider 20014.

Figure 9:
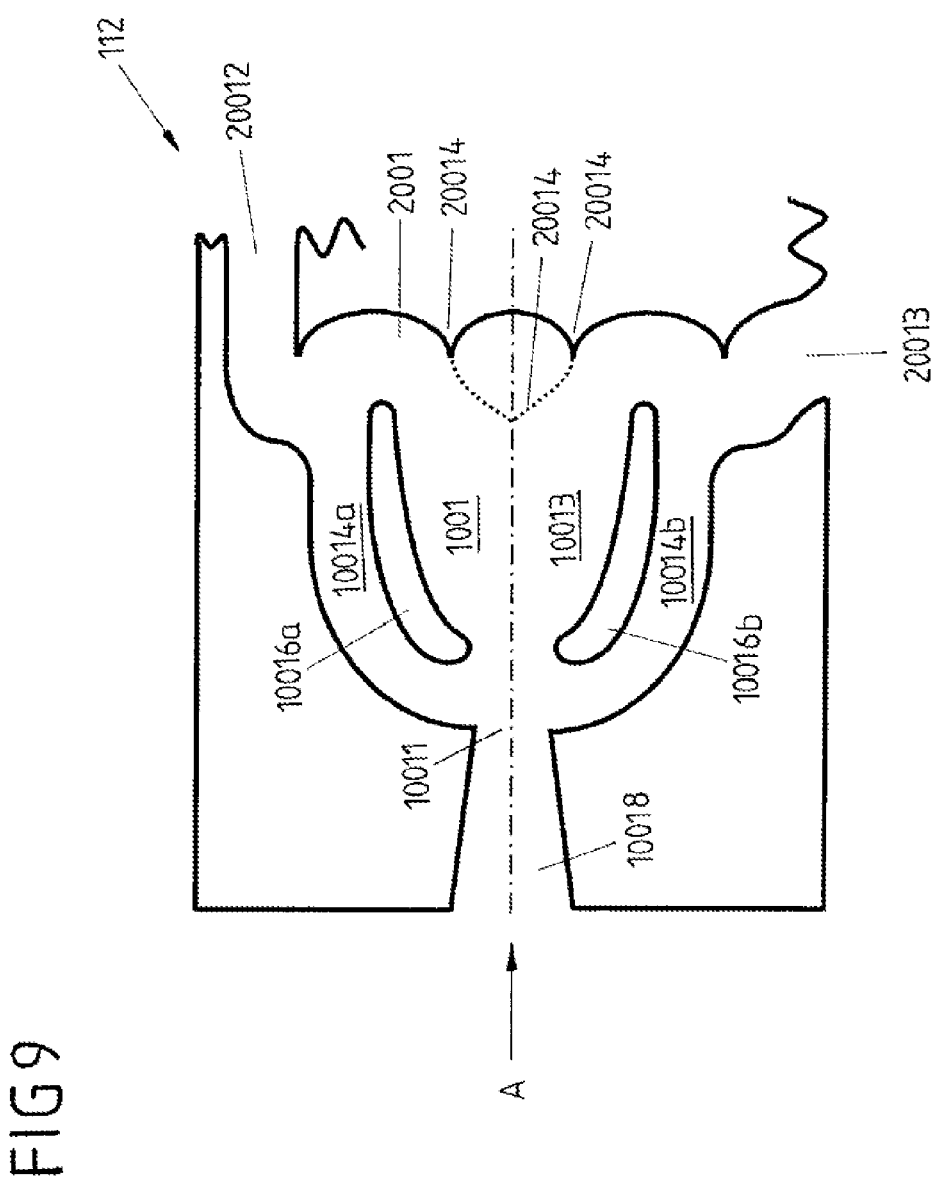
FIG. 9 shows a sectional representation through a fluidic component according to a further embodiment of the solution.

FIG. 9 shows a further embodiment for the fluidic component 112, again in a sectional representation. Here, the fluid flow is divided by multiple flow dividers 20014, which protrude into the flow chamber 1001 of the first subsystem 1000. In this respect, different arrangements and forms of the flow dividers 20014 are possible, as represented by way of example by the dashed line in FIG. 9.

In the individual FIGS. 1-9, various embodiments of the first subsystem 1000 and various embodiments of the second subsystem 2000 are represented in a specific combination. However, the first and second subsystems 1000, 2000 are interchangeable, so that any combinations of the first subsystem 1000 with the second subsystem 2000 are possible. The forms of the first subsystem that are shown in FIGS. 1 to 9 are only given by way of example. Alternatively, fluidic oscillators, which generate an oscillation by means of colliding fluid jets or by interacting vortices or areas of recirculation or have means for forming an oscillation of the fluid flow other than secondary flow channels (feedback-free fluidic components), may also be used.

In FIG. 10, a sectional representation through a fluidic component 112 according to a further embodiment is represented. The fluidic component 112 from FIG. 10 differs from the fluidic component 112 from FIG. 2 in particular in the configuration of the means for forming an oscillation of the fluid flow. While in the embodiment from FIG. 2 two secondary flow channels 10014*a*, 10014*b* are provided, fluidically connected to the main flow channel 10013 of the flow chamber 1001, in the embodiment from FIG. 10 the means 10020 for forming an oscillation of the fluid flow comprises a device 10022 for providing an auxiliary fluid flow and two feed lines 10021, which fluidically connect the device 10022 and the flow chamber 1001 of the fluidic component 112 to one another, the device 10022 being arranged upstream of the flow chamber 1001 of the fluidic component 112.

The device 10022 for providing an auxiliary fluid flow comprises a second fluidic component 112', which in terms of construction and function corresponds substantially to the fluidic component 112 from FIG. 2. The second fluidic component 112' has a flow chamber 1001', which can be flowed through by an auxiliary fluid flow, which enters the flow chamber 1001' through an inlet opening 10011' of the flow chamber 1001' and exits from the flow chamber 1001' through an outlet opening 10012' of the flow chamber 1001'. The flow chamber 1001' widens downstream (in the oscillation plane) and goes over into an outlet channel 10017', which tapers (in the oscillation plane) and ends in the outlet opening 10012'. The second fluidic component 112' also has as means 10014a', 10014b' for forming an oscillation of the auxiliary fluid flow at the outlet opening 10012' two secondary flow channels 10014a', 10014b', which are in each case fluidically connected by way of an entrance 10014a1', 10014b1' and an exit 10014a2', 10014b2' to a main flow channel 10013' of the flow chamber 1001' and in each case extend between the corresponding entrance 10014a1', 10014b1' and the corresponding exit 10014a2', 10014b2'. The form of the inner blocks 10016a', 10016b', which separate the secondary flow channels 10014a', 10014b' from the main flow channel 10013', is only shown by way of example in FIG. 10 (in the oscillation plane with a triangular cross section) and may be designed differently as desired, for example as shown in FIGS. 2, 4-9.

At the outlet opening 10012' of the second fluidic component 112', an oscillating auxiliary fluid flow exits and meets a second flow divider 10023 of a second separation chamber 10024, which is arranged downstream of this outlet opening 10012'. The second separation chamber 10024 is part of the means 10020 for forming an oscillation of the fluid flow. The second flow divider 10023 deflects the oscillating auxiliary fluid flow exiting from the outlet opening 10012' of the second fluidic component 112' and entering the second separation chamber 10024 into the two feed lines 10021. The feed lines (in particular their upstream ends) are arranged on the near side and far side of the second flow divider 10023 in the oscillation plane of the auxiliary fluid flow. Consequently, the auxiliary fluid flow flows alternately into the one or other feed line 10021. In this way, the feed lines 10021 can provide the auxiliary fluid flow of the flow chamber 1001 of the fluidic component 112 in a phase-shifted manner. The second flow divider 10023 has a concave form when viewed in the direction of fluid flow. Other forms are possible.

The feed lines 10021 extend from the second flow divider 10023 downstream initially in diverging directions (first portion) and subsequently in each case in the direction of the flow chamber 1001 of the fluidic component 112 (second portion). The first portions (in particular their upstream ends) are in this case arranged in the oscillation plane of the oscillating auxiliary fluid flow exiting from the second fluidic component 112'. Further portions may be provided between the first and second portions. The flow chamber 1001 of the fluidic component 112 is arranged between the downstream ends 100212 of the feed lines 10021. Between the inlet opening 10011, at which the fluid flow enters the flow chamber 1001, and the outlet opening 10012, at which the oscillating fluid flow exits from the flow chamber 1001, the flow chamber 1001 of the fluidic component 112 has lateral openings, by way of which the flow chamber 1001 is fluidically connected to the downstream ends 100212 of the feed lines 10021. In the embodiment of FIG. 10, the downstream ends 100212 of the feed lines 10021 are at the same height when viewed in the direction of fluid flow. Alternatively, they may be at different heights. Furthermore, the second portions of the feed lines 10021 extend in a plane that corresponds to the oscillation plane of the auxiliary fluid flow or the plane of extent of the first portions. Alternatively, the second portions of the feed lines 10021 may extend in different planes and/or in a plane different from the plane of extent of the first portions. Moreover, the second portions of the feed lines 10021 extend directly toward one another, so that they in each case form an angle of substantially 90° with the direction of fluid flow in the flow chamber 1001 of the fluidic component 112. Alternatively, this angle may be greater than 0° and less than 180°. In this case, the angle that the second portion of the one feed line 10021 forms with the direction of fluid flow in the flow chamber 1001 of the fluidic component 112 may deviate from the angle that the second portion of the other feed line 10021 forms with the direction of fluid flow in the flow chamber 1001 of the fluidic component 112, so that the second portions of the feed lines do not necessarily have to extend directly toward one another. In any event, the auxiliary fluid flow meets with a lateral component the fluid flow flowing in the flow chamber 1001 of the fluidic component, so that the auxiliary fluid flow laterally diverts the fluid flow. Since the auxiliary fluid flow exits alternately from the one or the other feed line 10021, the lateral diversion takes place alternately from one side or the other, so that the fluid flow performs an oscillating motion. The oscillating motion takes place in the plane that is defined by the second portions of the feed lines 10021. The oscillating motion has the effect that the fluid flow acts alternately on the opposite side walls 1016a, 1016b of the flow chamber 1001, provided in each of which is an opening by way of which the flow chamber 1001 is fluidically connected to a feed line 10021. The flow chamber 1001 widens downstream, that is to say its extent transversely to the direction of fluid flow and in the oscillation plane increases from the inlet opening 10011 to the outlet opening 10012 (for example steadily).

As already described for the embodiment of FIG. 2, the oscillating fluid flow exits from the outlet opening 10012 of the fluidic component 112 and enters the separation chamber 2001 of the separation device. A flow divider 20014 distributes the oscillating fluid flow at offset times into three outlet openings 20012, 20013, 20015 of the separation chamber 2001. The flow divider 20014 has a concavely curved form when viewed in the direction of fluid flow. The separation device is designed in such a way that the part of the oscillating fluid flow that is deflected into the first outlet opening 20012 of the separation chamber 2001, the part of the oscillating fluid flow that is deflected into the second outlet opening 20013 of the separation chamber 2001 and the part of the oscillating fluid flow that is deflected into the third outlet opening 20015 of the separation chamber 2001 are not brought together again downstream of the flow divider 20014. Alternatively, it is sufficient if the part of the oscillating fluid flow that is deflected into the first outlet opening 20012 of the separation chamber 2001 is not brought together downstream of the flow divider 20014 with the remaining fluid flow that is deflected into the two other outlet openings 20013, 20015. The first outlet opening 20012 has a smaller cross-sectional area transversely to the direction of fluid flow than the two other outlet openings 20013, 20015, and in particular a smaller extent in the oscillation plane and transversely to the direction of fluid flow (in the respective outlet opening). The first outlet opening 20012 of the separation chamber 2001 lies (substantially) on the axis that connects the inlet opening 10011 and the outlet opening 10012 of the fluidic component 112 to one another. This axis may for example lie midway between the maximum deflections of the oscillating fluid flow. The part of the oscillating fluid flow that exits from the first outlet opening 20012 of the separation chamber 2001 corresponds to the useful signal. With the form of the separation chamber 2001, in particular of the flow divider 20014, and with the relative size of the cross-sectional area of the first outlet opening 20012 transversely to the direction of fluid flow (with reference to the corresponding size of the inlet opening 10011, the second outlet opening 20013 and the third outlet opening 20015), the course over time of the useful signal can be influenced (pulse interval T, pulse width b). The number of outlet openings 20012, 20013, 20015 of the separation chamber 2001 is given by way of example in FIG. 10 and may deviate from 3.

While the oscillation frequency of the second fluidic component 112', which also dictates the oscillation frequency of the fluidic component 112, can be used to influence the pulse interval T of the fluid flow pulse exiting from the separation device 2000 as a useful signal, the entry pressure at the inlet opening 10011 of the fluidic component 112 can be used to control its signal intensity. A change of the oscillation frequency/the pulse interval T consequently does not have a decisive effect on the signal intensity.

The auxiliary fluid flow flowing into the inlet opening 10011' of the second fluidic component 112' is provided by an auxiliary fluid flow source, while the fluid flow flowing into the inlet opening 10011 of the fluidic component 112 is provided by a fluid flow source. The fluid flow source and the auxiliary fluid flow source may be sources that are different from one another. Alternatively, they may originate from a common source. In particular, the fluid flow source and the auxiliary fluid flow source may provide flows with a different exit pressure, flow rate. The fluid flow source and the auxiliary fluid flow source may in each case provide a gas as the fluid.

In FIG. 11, a sectional representation through a fluidic component 112 according to a further embodiment is represented. The fluidic component 112 from FIG. 11 differs from the fluidic component 112 from FIG. 10 in particular in the configuration of the flow divider 20014 of the separation chamber 2001 downstream of the outlet opening 10012 of the fluidic component 112. In this embodiment, the flow divider 20014 protrudes in a pointed form into the separation chamber 2001. The sharp-edged inlet geometry of the first outlet opening 20012 (that is to say the form of the flow divider 20014 in the region of the first outlet opening 20012) allows the front and rear flanks of a pulse, and consequently the pulse width b, of the useful signal to be influenced. The sharper-edged the inlet geometry of the first outlet opening 20012 is, the steeper the flank of the pulse of the useful signal is, as long as no secondary flow effects are provoked by the form of the inlet geometry of the first outlet opening 20012.

The invention claimed is:

1. A fluidic component for generating an ultrasonic signal, with a flow chamber, which can be flowed through by a fluid flow, which enters the flow chamber through an inlet opening of the flow chamber and exits from the flow chamber through an outlet opening of the flow chamber, wherein the fluidic component has at least one means for forming an oscillation of the fluid flow at the outlet opening, the at least one means comprising at least two secondary flow channels, which are in each case fluidically connected by way of an entrance and an exit to a main flow channel of the flow chamber and in each case extend between the corresponding entrance and the corresponding exit, the oscillation taking place in an oscillation plane, the fluidic component further comprising a separation device, which is designed to separate off a part from the oscillating fluid flow, wherein the separation device comprises an inlet opening, through which the oscillating fluid flow enters the separation device, and at least one first outlet opening and at least one second outlet opening, through each of which a part of the oscillating fluid flow exits, wherein provided between the at least one first outlet opening of the separation device and the at least one second outlet opening of the separation device is a flow divider, which deflects the oscillating fluid flow alternately into the at least one first and at least one second outlet opening of the separation device, and wherein the separation device is designed in such a way that the part of the oscillating fluid flow that is deflected into the at least one first outlet opening of the separation device and the part of the oscillating fluid flow that is deflected into the at least one second outlet opening of the separation device are not brought together again downstream of the flow divider, and wherein the at least one first outlet opening and the at least one second outlet opening of the separation device have a different extent in the oscillation plane and transversely to the direction of fluid flow.

2. The fluidic component as claimed in claim 1, wherein the separation device is designed in such a way that the part of the fluid flow that exits from the at least one first outlet opening of the separation device and the part of the fluid flow that exits from the at least one second outlet opening of the separation device are in each case directed along an axis, the axes diverging in the direction of fluid flow.

3. The fluidic component as claimed in claim 1, wherein at least one of:

the at least one first outlet opening of the separation device and the inlet opening of the separation device have in each case an extent in the oscillation plane and transversely to the direction of fluid flow, said extent of the at least one first outlet opening of the separation device being less than or equal to 150% of said extent of the inlet opening of the separation device, and the at least one first outlet opening of the separation device has a smaller cross-sectional area transversely to the direction of fluid flow than the inlet opening of the separation device.

4. The fluidic component as claimed in claim 1, wherein the separation device is arranged downstream of the outlet opening of the flow chamber.

5. The fluidic component as claimed in claim 1, wherein at least one of:

the flow divider comprises at least one curved wall, which is curved outwardly when viewed in the direction of fluid flow, and the flow divider and a wall that is adjacent to the flow divider and limits the at least one first outlet opening of the separation device form an angle which is less than 95°.

6. The fluidic component as claimed in claim 1, wherein at least one of:

the flow chamber has an extent perpendicularly to the oscillation plane, the extent being variable, and the at least one first outlet opening of the separation device is variable in its position, form and/or size.

7. The fluidic component as claimed in claim 1, wherein the at least two secondary flow channels have different lengths.

8. The fluidic component as claimed in claim 7, wherein a first of the at least two secondary flow channels is at least twice as long as a second of the at least two secondary flow channels.

9. The fluidic component as claimed in claim 1, wherein the at least one first outlet opening of the separation device is provided to give off a part of the oscillating fluid flow as an ultrasonic signal, while the at least one second outlet opening of the separation device is provided to give off a remainder of the fluid flow.

10. The fluidic component as claimed in claim 1, wherein a device for sound attenuation is provided in the region of the at least one second outlet opening of the separation device.

11. The fluidic component as claimed in claim 1, wherein the fluidic component is designed to generate an ultrasonic signal which comprises pulses which have a temporal pulse interval in relation to one another and in each case a full width at half maximum, the pulse interval being greater than or equal to twice the full width at half maximum.

12. The fluidic component as claimed in claim 1, wherein the means for forming an oscillation of the fluid flow comprises a device for providing an auxiliary fluid flow and at least one feed line, which is fluidically connected on the one hand to the device and on the other hand to the flow chamber of the fluidic component in order to feed the auxiliary fluid flow to the flow chamber, wherein the at least one feed line is arranged with respect to the flow chamber in such a way that the auxiliary fluid flow enters the flow chamber at an angle unequal to 0° in relation to the fluid flow flowing from the inlet opening to the outlet opening, and in that the auxiliary fluid flow is provided by the device as an oscillating auxiliary fluid flow, so that the at least one feed line feeds the auxiliary fluid flow to the flow chamber of the fluidic component variably over time.

13. The fluidic component as claimed in claim 12, wherein the device for providing an auxiliary fluid flow comprises a second fluidic component, which comprises a flow chamber that can be flowed through by the auxiliary fluid flow, which enters the flow chamber through an inlet opening of the flow chamber and exits from the flow chamber through an outlet opening of the flow chamber, wherein the second fluidic component has at least one means for forming an oscillation of the auxiliary fluid flow at the outlet opening, the oscillation taking place in an oscillation plane, wherein the at least one means for forming an oscillation of the auxiliary fluid flow comprises a secondary flow channel, which is fluidically connected by way of an entrance and an exit to a main flow channel of the flow chamber and extends between the entrance and the exit.

14. The fluidic component as claimed in claim 12, wherein the means for forming an oscillation of the fluid flow comprises two feed lines, which are in each case fluidically connected to the flow chamber on opposite sides of the flow chamber of the fluidic component.

15. The fluidic component as claimed in claim 14, wherein at least one of:
provided downstream of the device for providing an auxiliary fluid flow is a second flow divider, which deflects the oscillating auxiliary fluid flow exiting from the device alternately into the two feed lines, and
the two feed lines are flowed through by the auxiliary fluid flow at offset times.

16. The fluidic component as claimed in claim 1, wherein the separation device comprises at least one first outlet opening, at least one second outlet opening and at least one third outlet opening, through each of which a part of the oscillating fluid flow exits, wherein provided between the at least one first outlet opening of the separation device, the at least one second outlet opening of the separation device and the at least one third outlet opening of the separation device is a flow divider, which deflects the oscillating fluid flow alternately into the at least one first, second and third outlet opening of the separation device, wherein one of the outlet openings lies on an axis which extends substantially midway between the maximum deflections of the oscillating fluid flow, and has a smaller cross-sectional area than the other outlet openings of the separation device.

17. A device for generating an ultrasonic signal, wherein the device comprises a fluidic component for generating an ultrasonic signal as claimed in claim 1 and a fluid flow source for providing a fluid flow, wherein the fluid flow source is fluidically connected to the inlet opening of the flow chamber of the fluidic component.

18. The device as claimed in claim 17, wherein at least one of:
the fluid flow source and/or the auxiliary fluid flow source comprises a valve, in order to set a pressure of the fluid flow or auxiliary fluid flow exiting from the fluid flow source and the auxiliary fluid flow source, respectively, and
the fluid flow source and the auxiliary fluid flow source are in each case a gas flow source.

19. An ultrasonic measurement device, comprising:
a device for generating an ultrasonic signal,
a device for receiving an ultrasonic signal, and
a signal processing unit for processing the received ultrasonic signal,
wherein the device for generating an ultrasonic signal comprises a fluidic component as claimed in claim 1.

20. The ultrasonic measurement device as claimed in claim 19, wherein the device for receiving an ultrasonic signal is configured to receive an ultrasonic signal emitted by the device for generating an ultrasonic signal and reflected outside the ultrasonic measurement device and to receive a reference signal, the reference signal being provided by the fluid flow exiting from the at least one second outlet opening of the separation device.

* * * * *